US011113851B2

(12) United States Patent
Chang et al.

(10) Patent No.: US 11,113,851 B2
(45) Date of Patent: Sep. 7, 2021

(54) CORRECTION OF SHARP-EDGE ARTIFACTS IN DIFFERENTIAL PHASE CONTRAST CT IMAGES AND ITS IMPROVEMENT IN AUTOMATIC MATERIAL IDENTIFICATION

(71) Applicant: The Board of Trustees of the Leland Stanford Junior University, Stanford, CA (US)

(72) Inventors: Ching-wei Chang, Oakland, CA (US); Lambertus Hesselink, San Jose, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 60 days.

(21) Appl. No.: 16/514,730

(22) Filed: Jul. 17, 2019

(65) Prior Publication Data
US 2020/0027254 A1    Jan. 23, 2020

Related U.S. Application Data

(60) Provisional application No. 62/701,241, filed on Jul. 20, 2018.

(51) Int. Cl.
*G06T 11/00* (2006.01)

(52) U.S. Cl.
CPC ......... *G06T 11/008* (2013.01); *G06T 11/006* (2013.01); *G06T 2211/421* (2013.01); *G06T 2211/424* (2013.01)

(58) Field of Classification Search
CPC .... G06T 11/008; G06T 11/006; G06T 11/005; G06T 7/0012; G06T 7/0014; G06T 7/0016; G06T 2211/421; G06T 2211/424
See application file for complete search history.

(56) References Cited

U.S. PATENT DOCUMENTS

| | | | |
|---|---|---|---|
| 2013/0235973 A1* | 9/2013 | Murakoshi | A61B 6/502 378/37 |
| 2014/0205057 A1* | 7/2014 | Koehler | G06T 7/0014 378/5 |
| 2019/0012521 A1* | 1/2019 | Cohen | G01N 33/5008 |

FOREIGN PATENT DOCUMENTS

| | | |
|---|---|---|
| WO | 2010/146503 | 12/2010 |
| WO | 2016/177903 | 11/2016 |

* cited by examiner

*Primary Examiner* — Chan S Park
*Assistant Examiner* — Daniel C Chang
(74) *Attorney, Agent, or Firm* — Beyer Law Group LLP

(57) ABSTRACT

A method for correcting image data from a differential phase contrast imaging system is provided. Data comprising distorted data due to spatial variation is obtained. The data is corrected by correcting the distorted data.

18 Claims, 22 Drawing Sheets
(17 of 22 Drawing Sheet(s) Filed in Color)

A

*X-rays projection in y-dir.*

B $\int \delta(x,y)dy$

C $\varphi = 2\pi \frac{D}{p_2}\frac{d}{dx}\int \delta(x,y)dy$

D $HT(\varphi)$

E

*Back-projected in y-dir.*

C

D

E

F

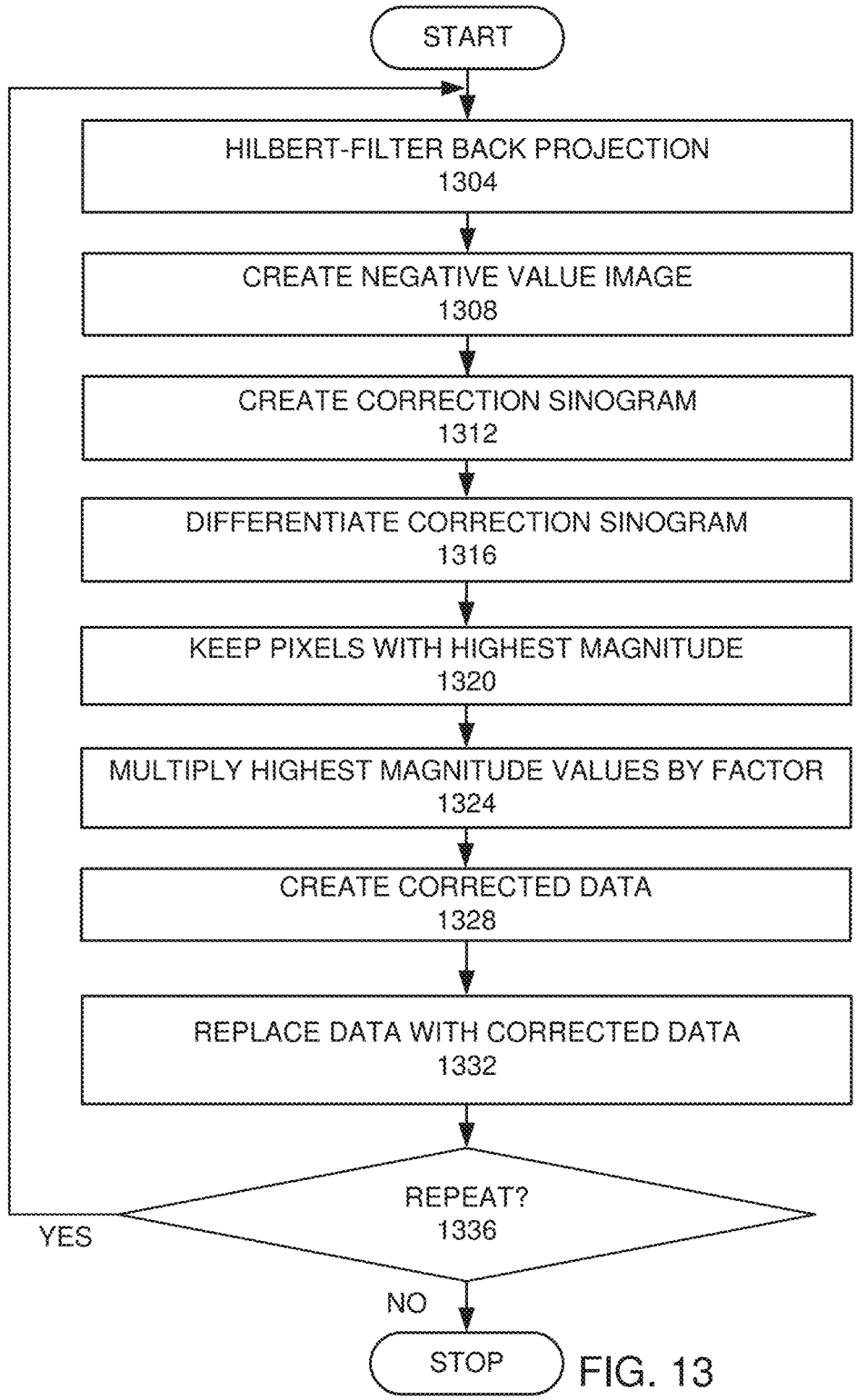

CORRECTION OF SHARP-EDGE ARTIFACTS IN DIFFERENTIAL PHASE CONTRAST CT IMAGES AND ITS IMPROVEMENT IN AUTOMATIC MATERIAL IDENTIFICATION

CROSS REFERENCE TO RELATED APPLICATIONS

This application claims priority under 35 U.S.C. § 119(e) from U.S. Provisional Application No. 62/701,241, entitled "CORRECTION OF SHARP-EDGE ARTIFACTS IN DIFFERENTIAL PHASE CONTRAST CT IMAGES AND ITS IMPROVEMENT IN AUTOMATIC MATERIAL IDENTIFICATION", filed Jul. 20, 2018 by CHANG et al.

GOVERNMENT RIGHTS

This invention was made with Government support under contract HSHQDC-12-C-00002 awarded by the U.S. Department of Homeland Security Science and Technology Directorate. The Government has certain rights in the invention.

BACKGROUND

X-ray computed tomography (CT) has been a major technique in various applications, including medical diagnosis and aviation security inspection. It allows noninvasive imaging, enabling quantitative analysis of the geometry and composition of tissues in human bodies or objects in luggage.

SUMMARY

In accordance with the invention, a method for correcting image data from a differential phase contrast imaging system is provided. Data comprising distorted data due to spatial variation is obtained. The data is corrected by correcting the distorted data.

In another manifestation, a system configured for correcting image data from a differential phase contrast imaging system is provided. A data storage device is configured to store image data from a differential phase contrast imaging of an object, wherein the image data comprises distorted data due to spatial variation. A display is provided. At least one processor is electrically connected to the display and the data storage device. Non-transient computer readable media is provided. The non-transient computer readable media comprises computer code for correcting the distorted data to provide corrected image data and computer code for displaying the corrected image data on the display.

The invention and objects and features thereof will be more readily apparent from the following detailed description and appended claims when taken with the drawings.

The patent or application file contains at least one drawing executed in color. Copies of this patent or patent application publication with color drawing(s) will be provided by the Office upon request and payment of the necessary fee.

FIGS. 2A-J are graphs that illustrate the cause of sharp-edge streak artifacts in DPC phase CT images.

Figure 3:
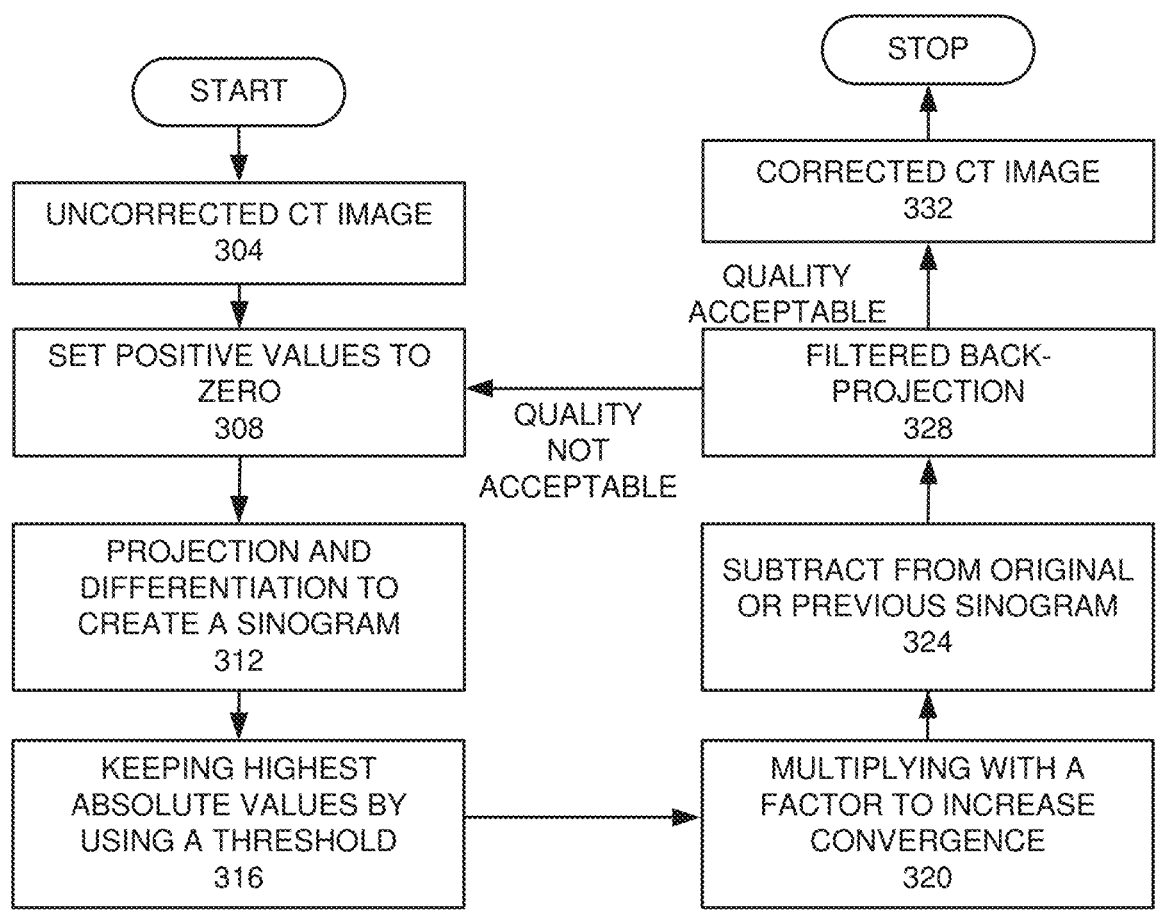

FIG. 3 is a flow chart of an algorithm used in an embodiment.

FIGS. 4A-F demonstrate the results of simulations of an embodiment of removing artifacts from a square.

Figure 5:
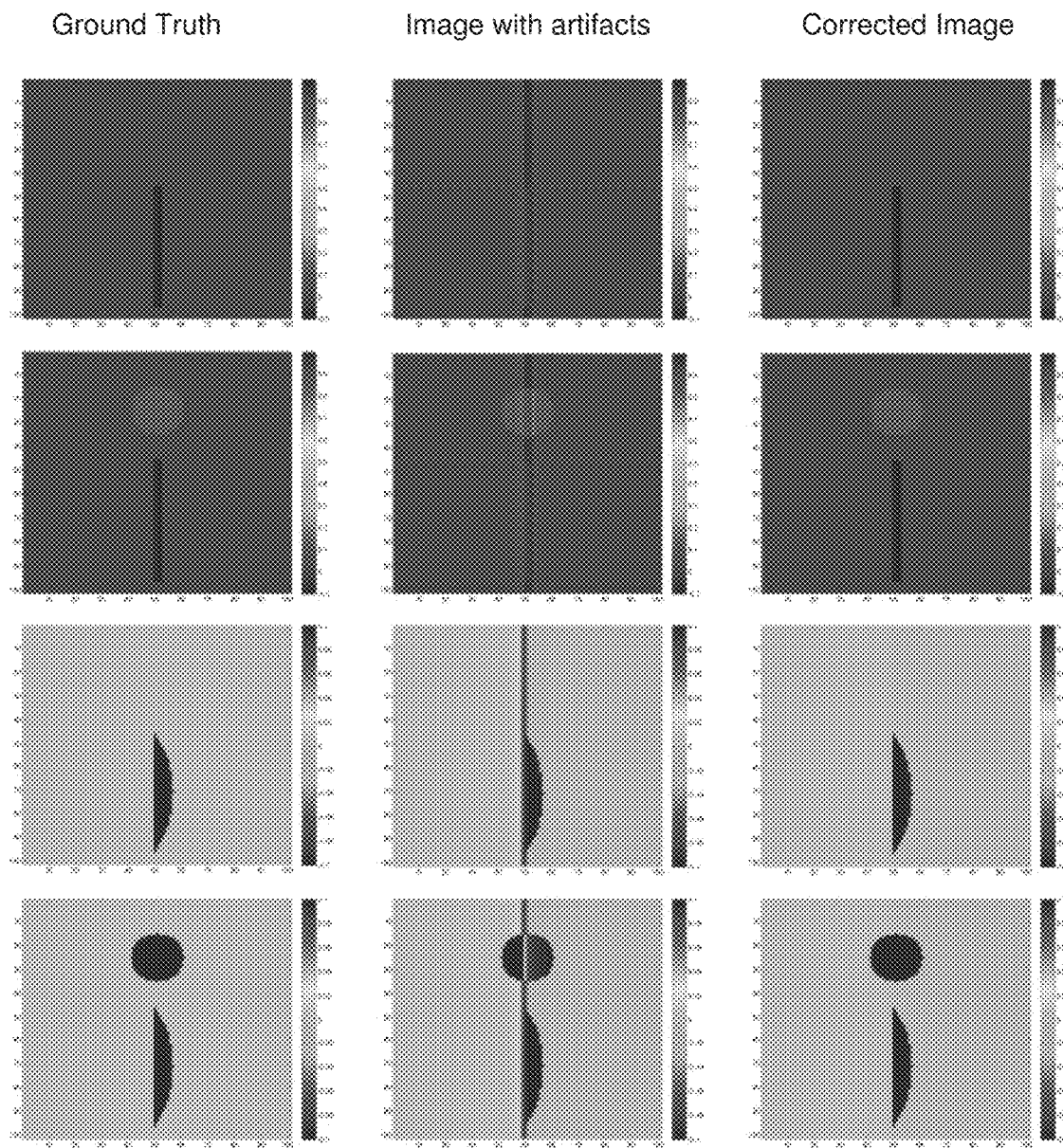

FIG. 5 shows images that demonstrate that the artifacts have higher magnitude when produced by longer sharp edges and that the objects located in the streak path may be impacted by the artifacts more than the objects actually producing them.

FIGS. 6A-F illustrate the removal of artifacts produced by sharp edges of a plastic toothbrush with a case by an embodiment.

FIGS. 7A-F shows that a second data set consists of a plastic toothbrush with a case, plus a cylindrical tube filled with water, and also illustrates the removal of artifacts produced by sharp edges of a plastic toothbrush with a case by an embodiment.

Figure 8A:
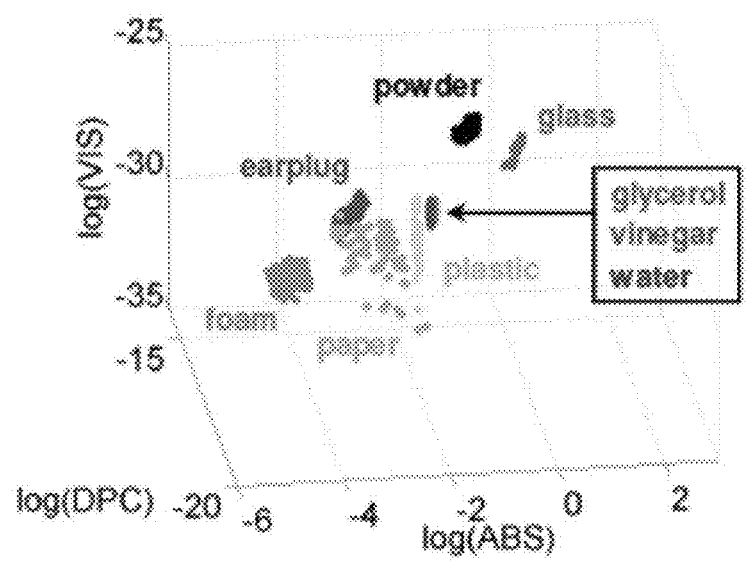
Figure 8B:
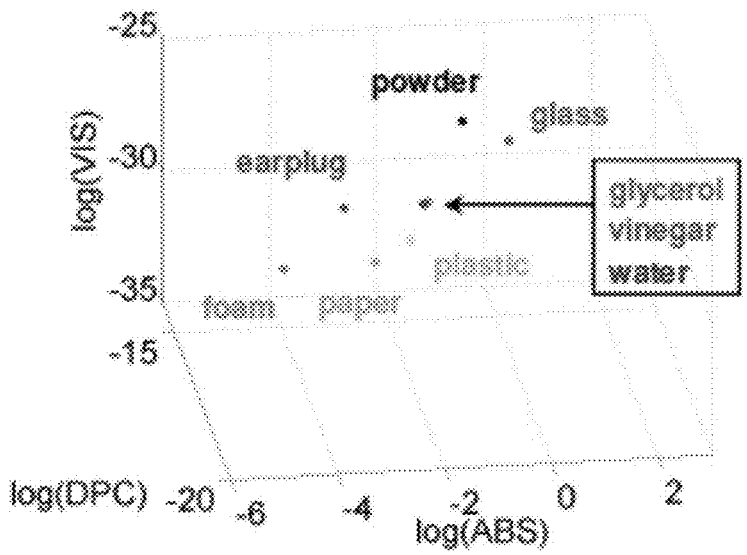
Figure 8C:
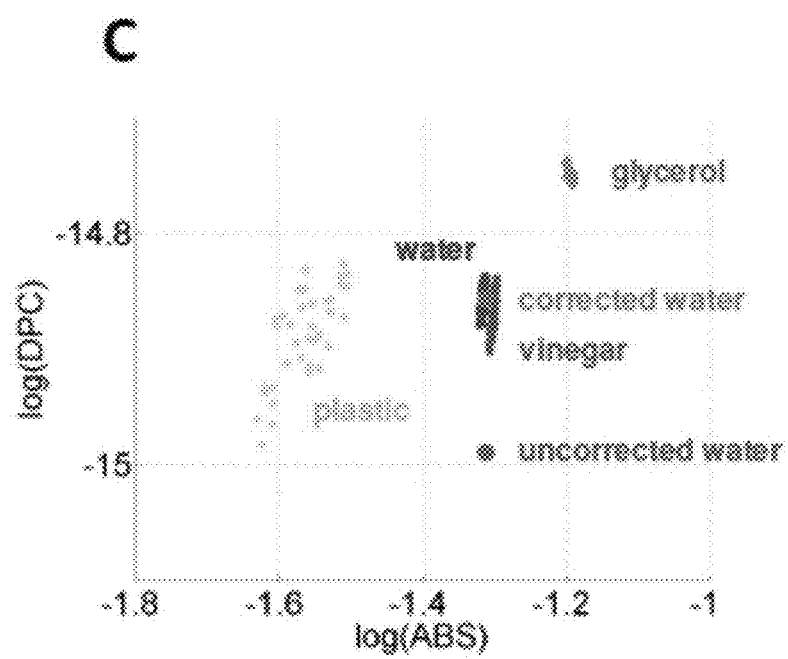

FIGS. 8A-C show data distributions and query points in material identification, and show how the removal of artifacts produced by sharp edges of a plastic toothbrush with a case by an embodiment improves material identification.

Figure 9A:
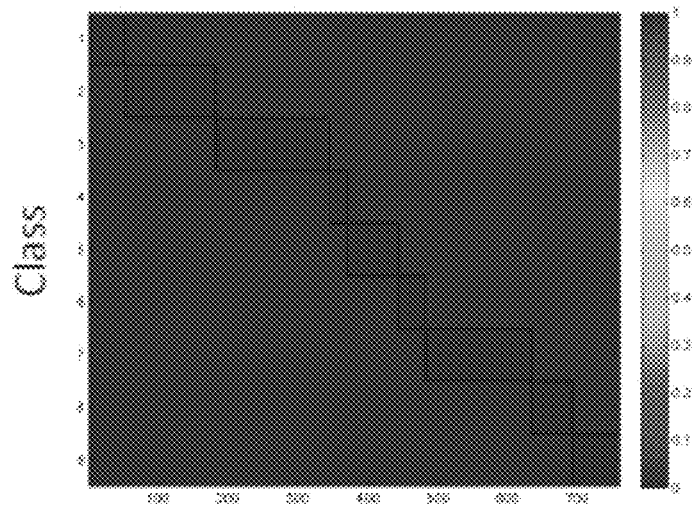
Figure 9B:
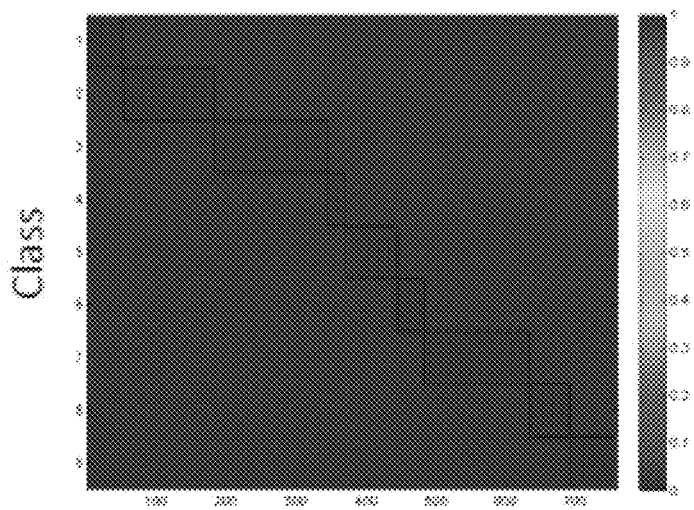
Figure 9C:
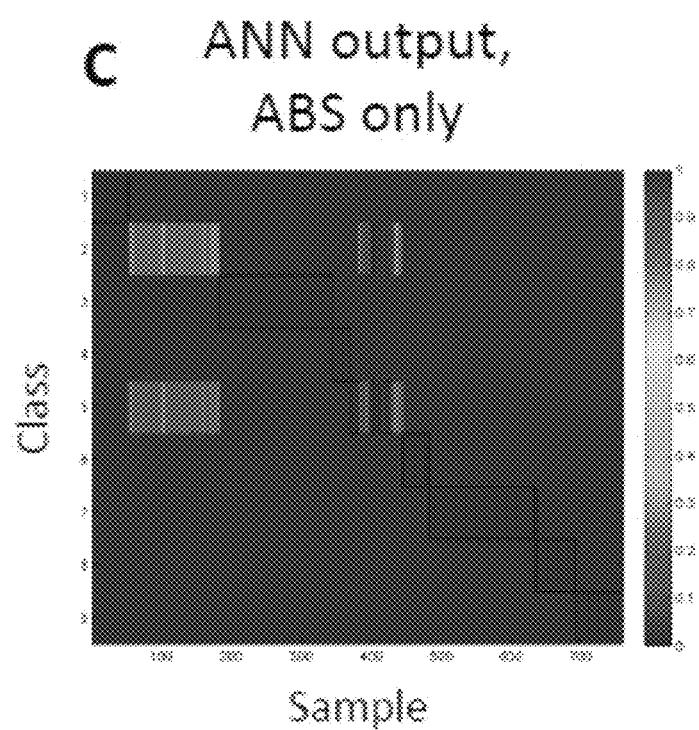

FIGS. 9A-C shows that the influence of the overlapping distributions in the ABS dimension is reflected in the training process of ANN, and that DPC tri-signatures can successfully resolve materials with high certainty.

Figure 10:
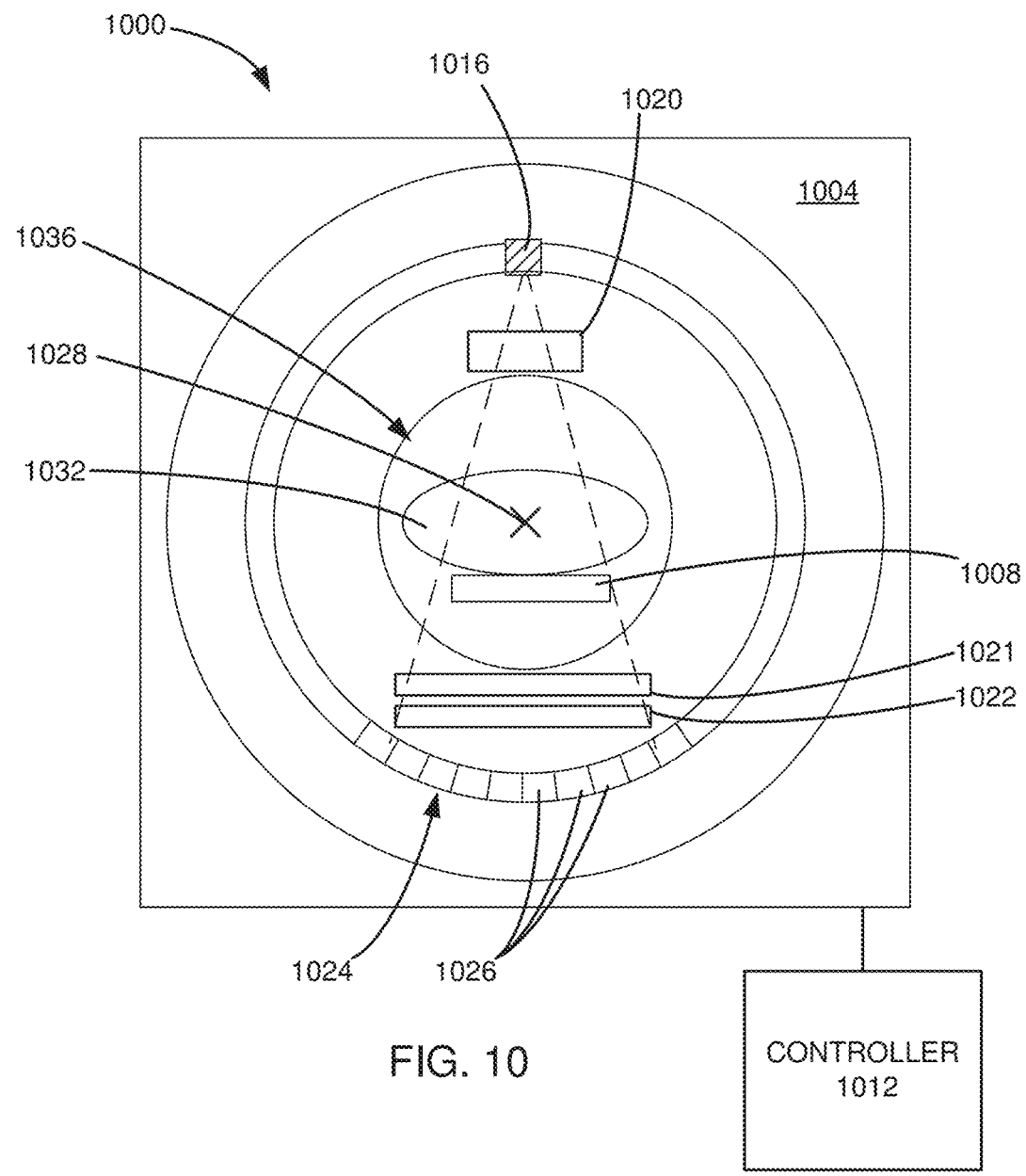

FIG. 10 is a schematic top view of a computed tomography (CT) system that may be used in an embodiment of the invention.

Figure 11:
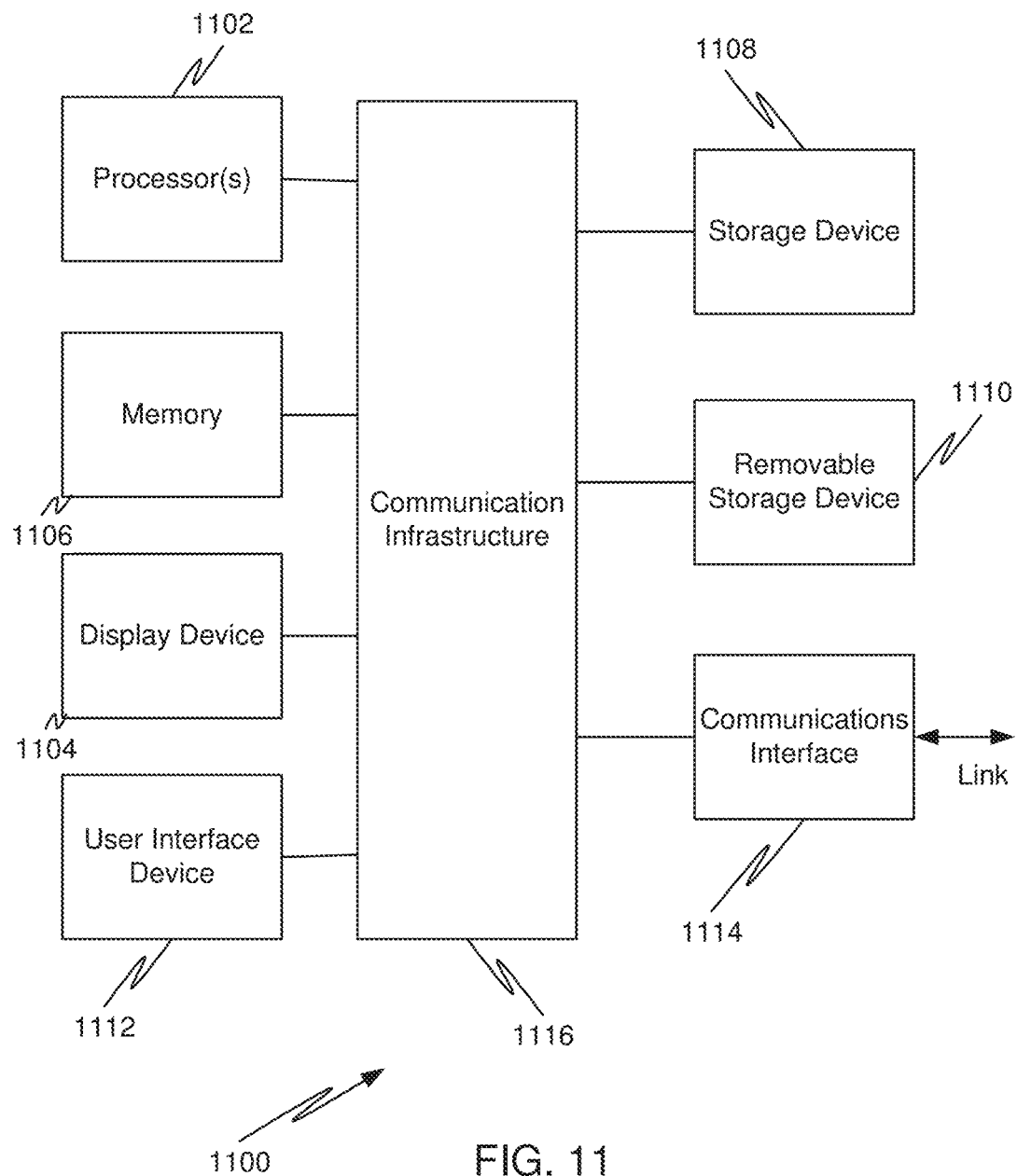

FIG. 11 illustrates a computer system that may be used in an embodiment of the invention.

Figure 12:
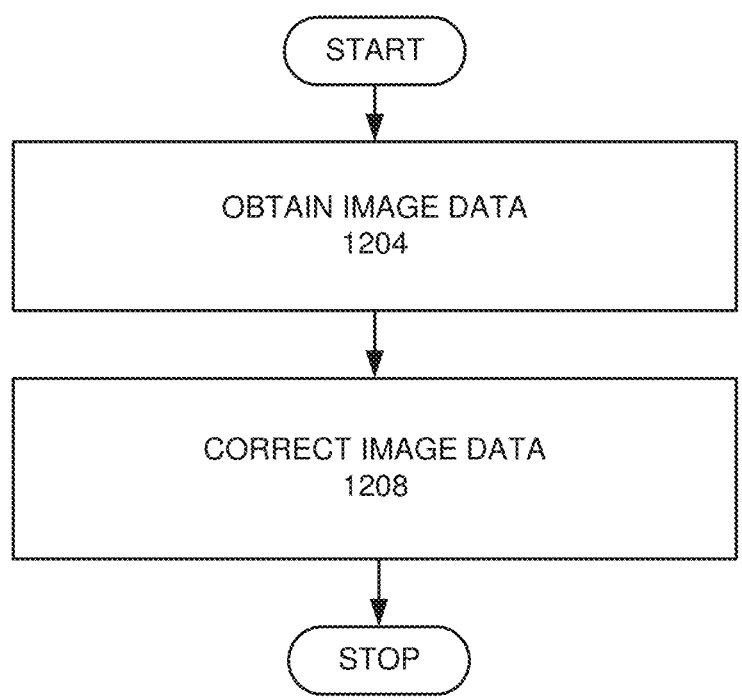

FIG. 12 is a high level flow chart of another embodiment of the invention.

FIG. 13 is a more detailed flow chart of an embodiment of the invention.

DETAILED DESCRIPTION OF ILLUSTRATED EMBODIMENTS

In conventional X-ray CT imaging, contrast is provided by the differences in the X-ray absorption of the material, which characterizes the attenuation of X-rays by photoelectric absorption, Compton scattering, and Rayleigh scattering processes in the imaged material. This offers superb results when solid materials with highly-absorbing materials and high Z numbers are considered. However, as far as liquids and low-density materials such as soft tissues are concerned, the X-ray absorption contrast is generally low. As a result, the discrimination of different such materials in biomedical imaging (e.g. various tissues and lesions) and aviation security inspection (e.g. explosive liquids or powders and their precursors versus non-explosive ones), becomes a relatively difficult task using a conventional X-ray CT system and improvements may be needed.

Further, in many X-ray CT applications, human inspection can be problematic under the limits of human perception and cognition, especially when it is required to detect infrequent visual malignant signatures or threat signals among high levels of background clutter. It is true not only for medical diagnosis, where lesions and cancerous tissues may appear in different shapes and sizes, but also for luggage inspection, which has always been a challenge due to the content complexity, object orientation, and their irregular shapes, not to mention that it has to depend on human inspectors' focus, vigilance, and attention. In fact, this problem becomes even more complicated when the conventional X-ray CT technique suffers from beam-hardening artifacts due do bones and metals as well as from other artifacts. Therefore, new inspection techniques, as well as automatic discrimination systems, are highly desirable.

Potential approaches to addressing the above issues are to establish automatic discrimination and identification systems using a statistical approach or a machine-learning approach, with improved distinguishability of low-density materials in X-ray CT imaging using a grating-based differential phase-contrast (DPC) setting. DPC allows the retrieval of the phase shift information when X-rays pass through an object, and greatly improves the signal sensitivity for liquids and low-Z materials, without the need of high-brilliance synchrotron X-ray sources.

The potential of X-ray DPC imaging has been demonstrated in many applications, such as visualizing human liver lesions and soft tissues without contrast agents, revealing various small animal organs, and distinguishing liquids from powder. This is achieved not only by the X-ray phase information provided by DPC signals but also by the dark-field signals (or the visibility, VIS) that describes the degree to which the magnitude of X-ray modulation is reduced and can be considered as a by-product of DPC imaging. Combined with the conventional absorption (ABS) signals that will also be obtained simultaneously, DPC imaging provides three types of signals that mostly contain complementary information.

To fully utilize all three types of signals that DPC CT imaging offers in an automatic material discrimination setup, the reconstructed CT images may need to be segmented first with each material separated, whose feature signatures will then be extracted. Then, to implement high-throughput screening with minimal attention by human inspectors, automatic discrimination systems that use the extracted features to detect potential targets (such as lesions or threats) are needed. An alternative is to utilize deep learning and build a convolutional neural network model that can both retrieve features and identify targets in the images. In either case, images of various materials with accurate tri-signatures and well-defined shapes are needed for both the training and implementation of the model.

However, artifacts in reconstructed CT images, if existent, may have a significant negative impact on the entire process, including image segmentation, feature extraction, automatic material discrimination, and subsequent target identification as well as false alarm rates. CT image artifacts specific to DPC phase include phase-wrapping artifacts and sharp-edge (or phase-clipping) artifacts. While there have been some studies on correcting DPC phase wrapping, which occurs when phase values range beyond $2\pi$, studies on removing sharp-edge artifacts are deficient.

In a cluttered environment, items with sharp linear edges or fast phase accumulation may introduce artifacts that significantly alter the DPC phase signature of materials.

Figure 1A:
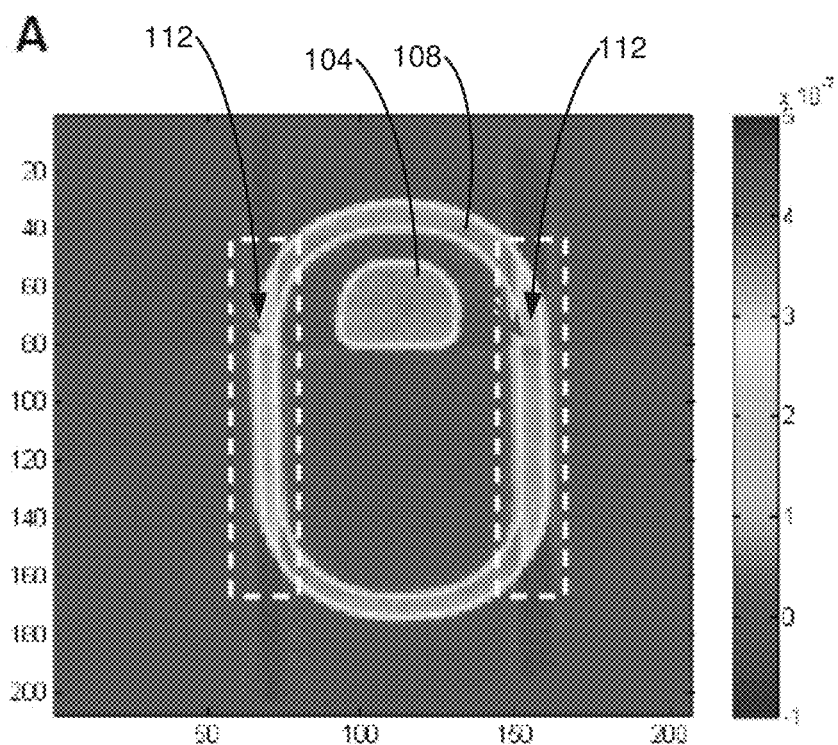
FIGS. 1A-B are images that show artifacts that may appear in differential phase contrast (DPC) phase computed tomography (CT) images.
Figure 1B:
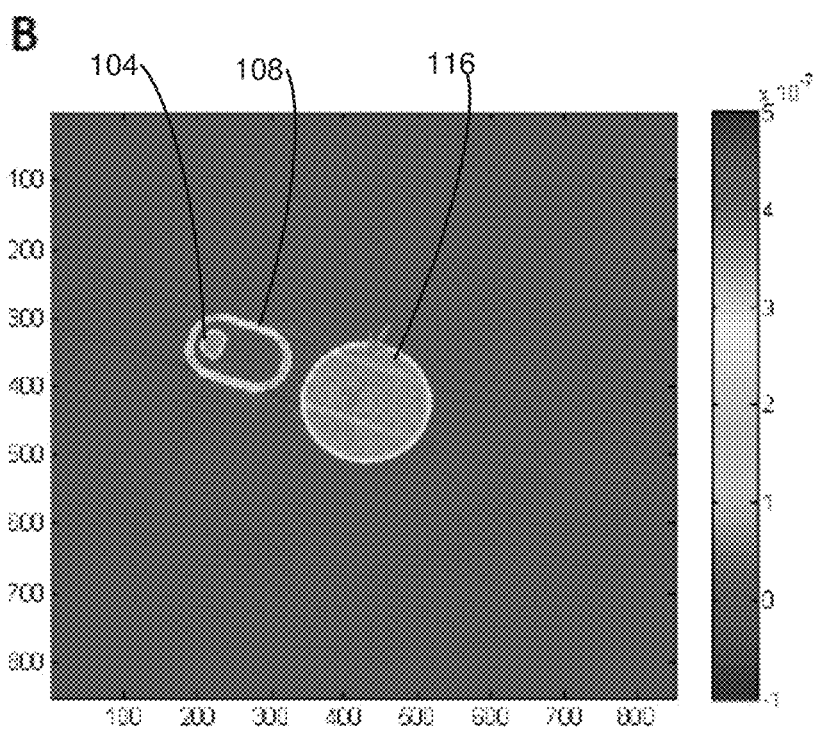

To facilitate understanding, FIG. 1A is a demonstration of the sharp-edge artifacts that may appear in DPC phase CT images. A tomographic phase image of a toothbrush 104 with a plastic case 108 is shown on the left in FIG. 1A. In FIG. 1A, streak artifacts caused by the sharp edges of the outer piece of the plastic case 108 can be clearly seen and decrease the phase signature intensity of the plastic case 108 itself, while the single sharp edge of the toothbrush 104 also produces artifacts that introduce intensity discontinuities 112 in the plastic case 108. In FIG. 1B, the same toothbrush 104 and its case 108 are shown again with a cylindrical tube of water 116. In this case, with multiple objects, the same artifacts mentioned earlier (streaks extending from the sharp edges of the toothbrush 104 outer piece) can be seen and will also affect the signature intensities (green arrows) of the water sample, i.e. the circular cross-section area of the water tube shown at the center of the image. Both images were acquired and reconstructed in a laboratory. The linear edges shown in FIGS. 1A-B are referred to as "sharp edges" from the projection point of view—the portions that cause sharp changes in the integrated phase signals over the X-ray beam paths.

In DPC imaging, basically any item that leads to a sharp change in the integration/projection of phase signals will cause artifacts in the sinogram, which produce errors in CT reconstruction and in subsequent material classification. These artifacts in the sinogram may be referred to as "missing-intensity artifacts" or "sharp-edge artifacts," and it may also be called "phase-clipping artifacts". This specification uses the first two terms interchangeably. In medical imaging applications, this problem has been found to be of crucial importance since items with relatively high density that cause sharp phase changes (such as bones and implants) will impact DPC phase signatures of various tissues and lesions. In security screening applications, on the other hand, objects with sharp edges (such as boxes and books with flat surfaces) are often mixed with other objects as part of clutter, in which case phase signatures of multiple materials will be altered due to the artifacts.

Figure 2A:
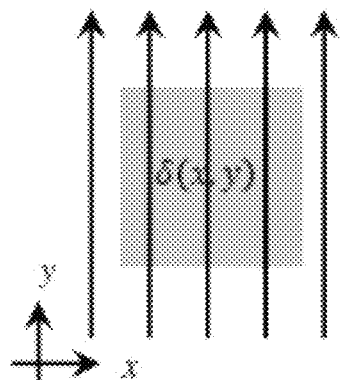
Figure 2B:
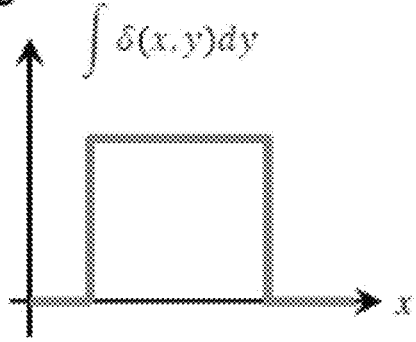
Figure 2C:
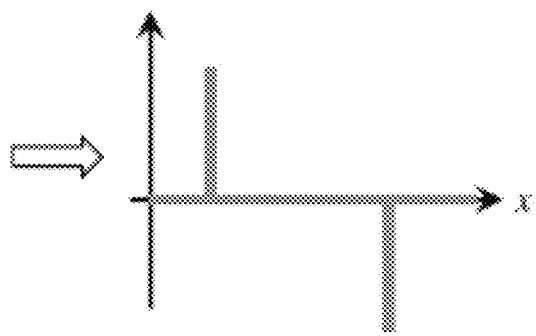
Figure 2D:
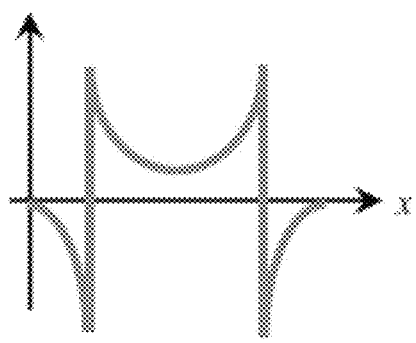
Figure 2E:
Figure 2E:
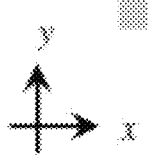
Figure 2F:
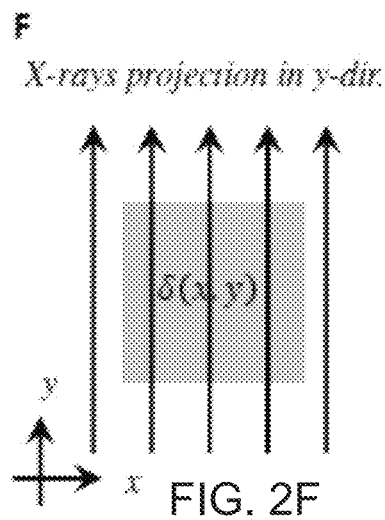
Figure 2G:
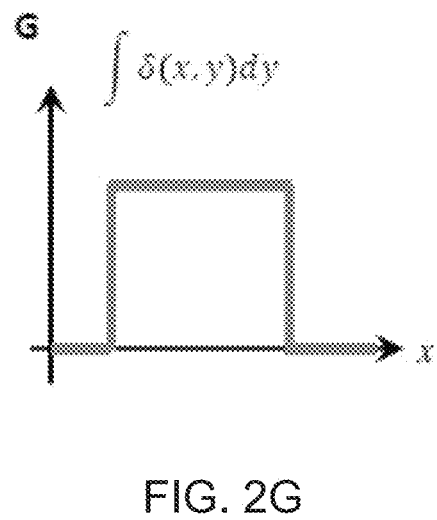
Figure 2H:
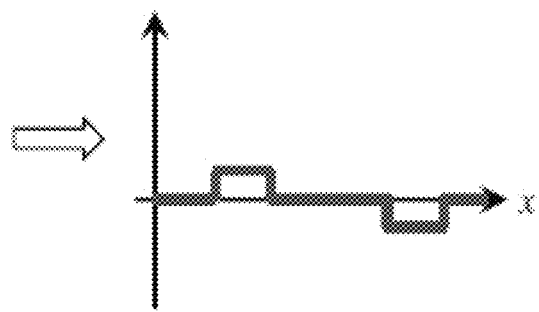
Figure 2I:
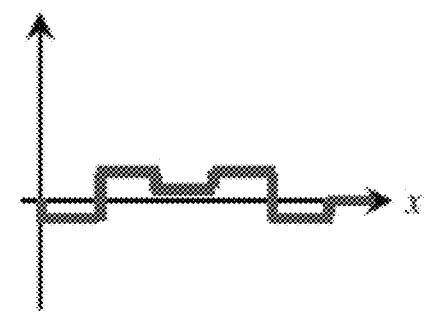
Figure 2J:
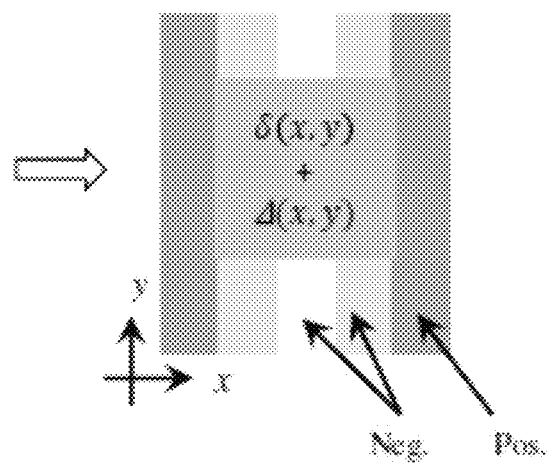

FIGS. 2A-J illustrate the cause of sharp-edge streak artifacts in DPC phase CT images. Following X-ray projection of a uniform object with sharp edges, shown in FIG. 2A, the corresponding integration of δ the refractive index decrement is shown in FIG. 2B and DPC signals, φ are shown in FIG. 2C. The DPC signals are the actual signals that can be retrieved using a 3-grating system and can be used to solve for δ (i.e. the phase signature). Ideally, the Hilbert transform, shown in FIG. 2D, and back-projection, shown in FIG. 2E can be applied to continuous DPC signals and perfect CT reconstruction of δ(x,y) can be achieved. However, in real-world applications, when retrieving the DPC signals using detectors with finite-sized pixels, the signal intensities can be highly underestimated due to the relatively small spatial extent of the signals compared to the pixel size, as shown in FIG. 2H. In this case, during Hilbert-filtered back-projection for DPC CT reconstruction, shown in FIGS. 2I-J, the underestimation of DPC signals causes missing filtered intensities, as shown comparing FIG. 2I and FIG. 2D, which in turn produce positive and negative streak artifacts Δ(x,y) in the reconstructed DPC CT images following back-projection, comparing FIG. 2J and FIG. 2E.

The alteration of the signature by the missing-intensity or sharp-edge artifacts will affect the performance of any automatic material discrimination algorithm that utilizes the signature for characterizing object/material features. This is especially true when the affected object is relatively small or has low signature values (such as low-density materials, e.g. soft tissues and liquids) since the object-averaged signature will be greatly altered by sharp-edge artifacts. Even for a large object, the missing-intensity artifacts may still have a great impact, since they may influence the results of image segmentation and the shape/outline feature of targets.

An approach to the phase-clipping problem has been proposed. However, a basic assumption of that approach is that the identities of the imaged materials are known in advance such that the required material-specific characteristics can be used to achieve artifact corrections. Clearly, this assumption is not valid in medical imaging as well as in security scanning, in which material identities are exactly what needs to be revealed by imaging.

This embodiment describes how sharp-edge artifacts in DPC phase CT images may be removed in an automated way, using a novel algorithm, which has been validated on both simulated and experimental data. The impact on the performance of subsequent automatic material discrimination/target recognition algorithms using machine-learning and statistical approaches will also be demonstrated. The algorithm in this embodiment can be an essential technique to facilitate the utilization of DPC technology in pre-clinical, clinical, as well as security screening applications, where sharp-edge artifacts can be one of the major sources causing signal inaccuracies.

Development of the Algorithm in an Embodiment

The negative-valued streaks caused by sharp linear edges (shown in FIG. 2J) become the driving force in correcting the artifacts in an algorithm used in an embodiment, as shown in FIG. 3. Note that while at some pixels the negative-valued streak will overlap with the cross-section of other objects and become positive, the streak intensity should remain below zero whenever the streak passes through void space (or air, where the signal is nearly zero and does not change the negative values of streak intensity). Even when the scanned objects are densely packed without voids in almost the entire field of view (FOV), the CT reconstruction can be performed in an extended cross-section area (extending out of the FOV), in which zero signals are expected (if there are no artifacts) because no objects are detected there. In that case, the negative-valued streaks will not overlap with any objects and will remain below zero in the extended area. These negative values can then be used in an algorithm for artifact corrections.

In an algorithm in an embodiment, the embodiment starts with an uncorrected CT image with artifacts (step 304). Next, only the negative-valued pixels in the image are kept by setting all positive valued pixels to zero (step 308). The resulting CT image with only negative values is then numerically projected to produce a sinogram, which can be differentiated properly to produce the corresponding DPC sinogram (step 312). Note that the actual implementation of this step depends on the geometry of the system (i.e. parallel beams vs. fan beams). How DPC CT projection and reconstruction can be performed with fan-beam geometry can be found elsewhere and will not be detailed in this specification. Parallel-beam results will be shown in the simulation section but fan-beam results will be shown in the experimental data section to demonstrate the feasibility of the algorithm under different conditions.

Following projection and differentiation, a new sinogram with both positive and negative values is created. The pixels with the highest absolute values in this sinogram are then kept by thresholding (step 316). In an embodiment, a threshold value of $>_{99}{}^{th}$ percentile of the data is used. This step is needed because the negative-valued artifacts would be projected at all CT angles in the previous projection step, but this embodiment is only interested in the projection angles along the sharp edges (where missing intensities need to be corrected), which is exactly where the highest absolute values would be produced in the differentiated sinogram. The choice of the threshold value may depend on the data quality and detector resolution. Note that when the transition at the edge is from low phase value to high phase value (in the differentiation or increasing index direction), a high negative differential value is expected (corresponding to the edge on the left in FIG. 2J), and vice versa (corresponding to the edge on the right in FIG. 2J). Therefore, both negative and positive values and absolute values for the algorithm of this embodiment are considered.

In this embodiment, a multiplication factor is used to speed up convergence (step 320). The pixels with highest absolute values are then subtracted from the original sinogram (the sinogram that produces the uncorrected CT image with artifacts) for partial correction (or, subtracted from the sinogram of the previous iteration for further correction) (step 324). Then Hilbert-filtered back-projection is performed on the partially corrected sinogram to obtain the CT image for the next iteration (step 328), which has less severe artifacts. Iterations are then progressed until a satisfactory CT image is achieved (step 332). As can be seen below in following sub-sections, a number of iterations as low as 20 is sufficient to remove the artifacts, and therefore the algorithm may be implemented fast enough in real time for practical use.

Note that the above steps can be simplified by projecting the negative-valued streaks, and also carrying out all subsequent steps, only at the angles along these streaks in the CT image, without performing them for the entire sinogram, in which most of the signals remain unaltered. This can tremendously speed up the iterations, but may also require more subjective judgments/human intervention to the algorithm, and can also become more complicated when plenty of sharp edges exist. Therefore, an embodiment applies the algorithm to the entire sinogram in practice to facilitate automation, unless the geometry of the imaged objects is relatively simple.

Simulations Demonstrating Nearly Complete Artifact Removal

Figure 4A:
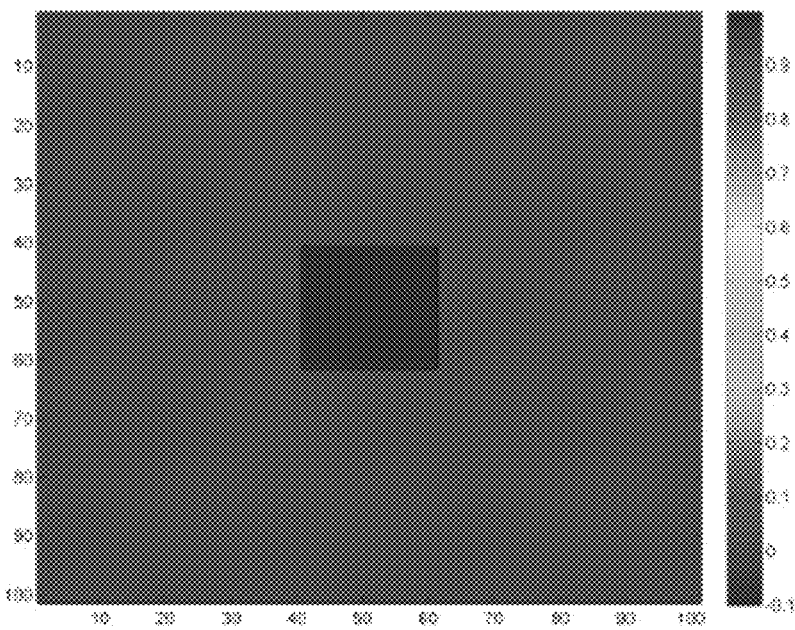
Figure 4B:
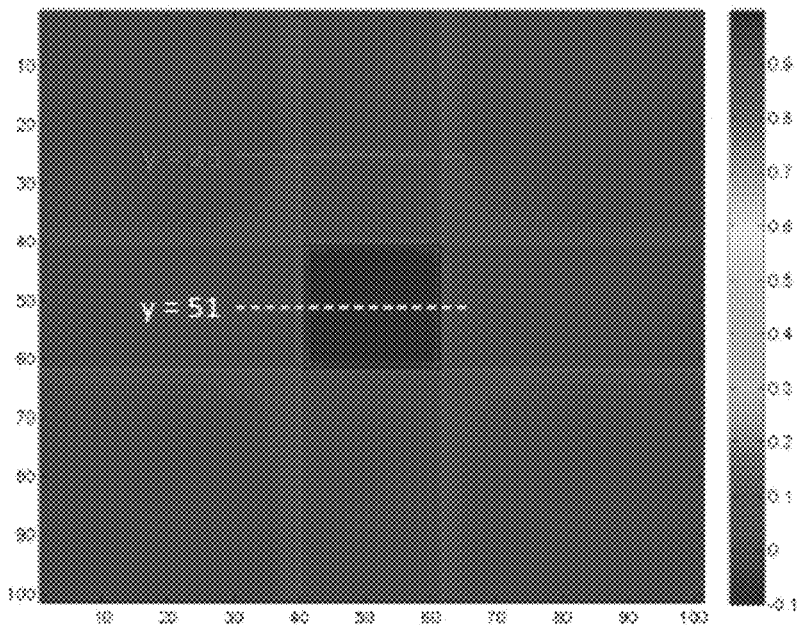
Figure 4C:
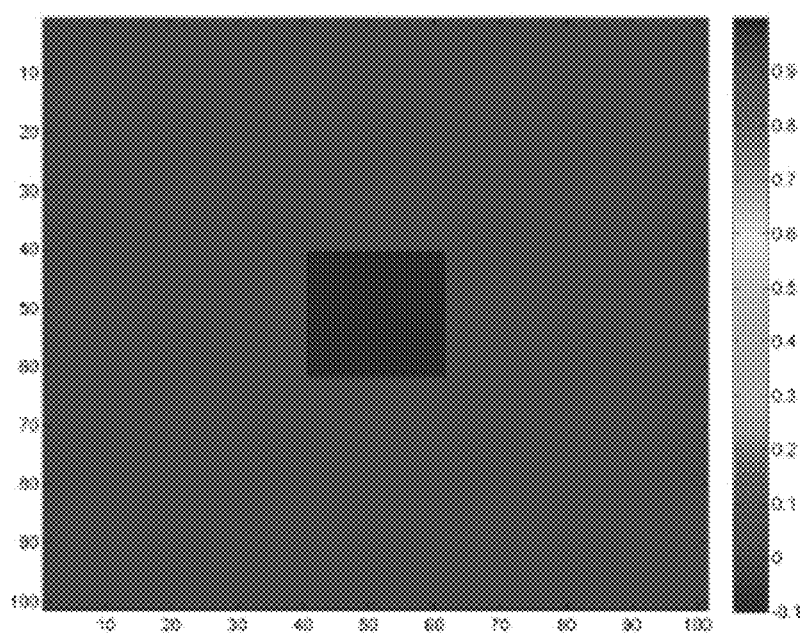
Figure 4D:
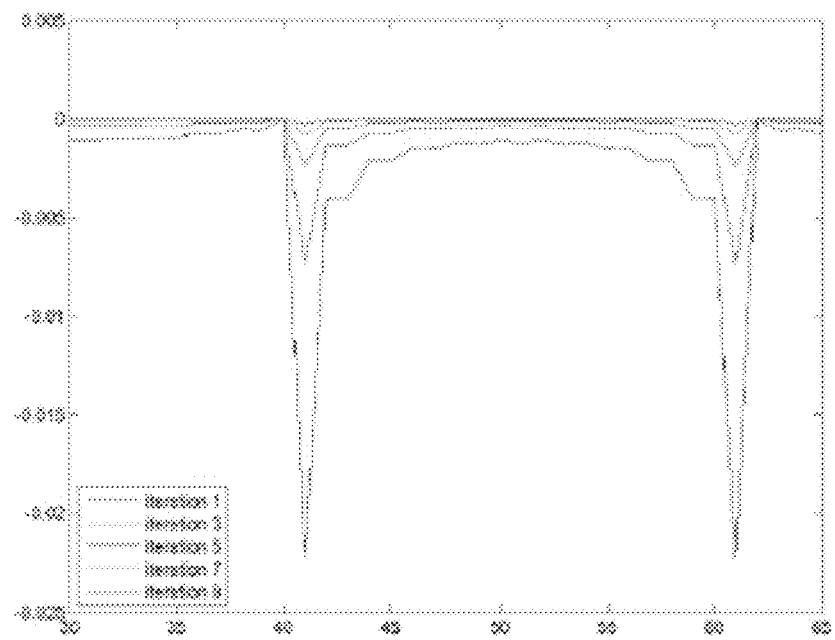
Figure 4E:
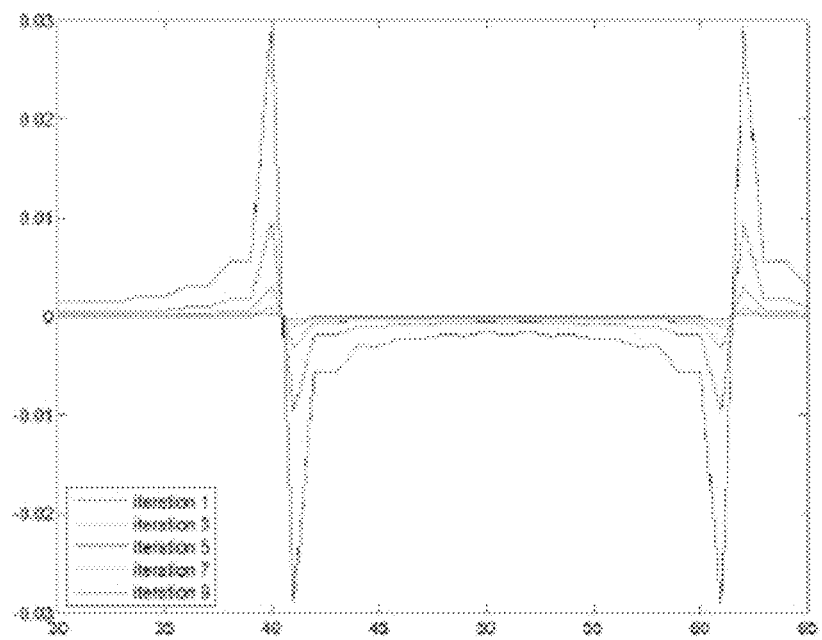
Figure 4F:
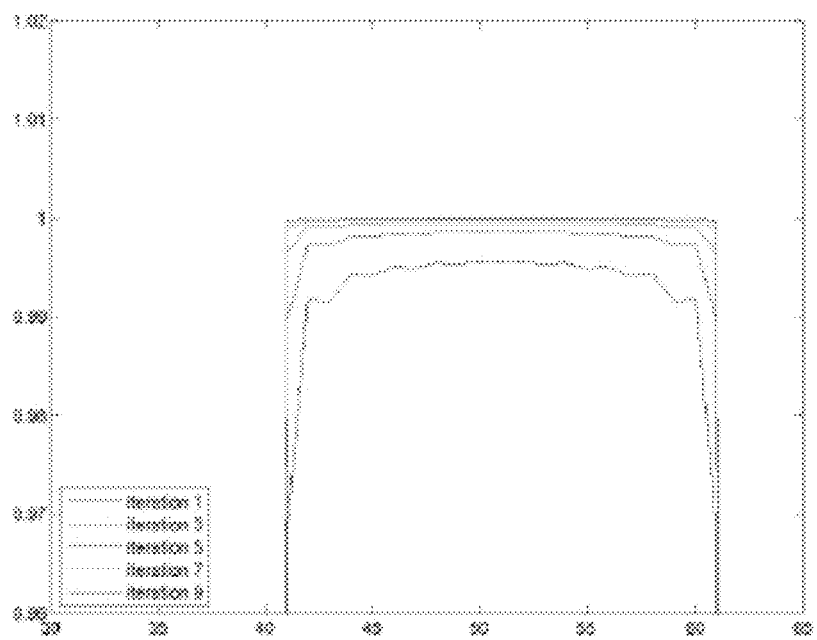

FIGS. 4A-F demonstrate the results of simulations of an embodiment of removing artifacts from a square, which is a commonly encountered shape with two pairs of equal length, parallel sharp edges. Note that this is the simulation of the example shown in FIG. 2J with additional artifacts following back-projection in the x-direction due to the horizontal parallel sharp edges. From the corrected CT image, shown in FIG. 4C, it can be clearly seen that there are no noticeable artifacts left following the algorithm (compared to the original artifact-corrupted image, shown in FIG. 4B) and it appears the same as the ground-truth image, shown in FIG. 4A. FIG. 4A-F show the summed (i.e. projected) profiles of negative-valued pixels along y(vertical)-direction through iterations, as shown in FIG. 4D, which, with parallel-beam geometry, are to be differentiated to obtain highest-absolute-value pixels in the algorithm (these negative values are to be corrected by the algorithm and should gradually disappear through iterations, as shown in FIG. 3). FIG. 4D shows summed profiles of negative-valued pixels along y(vertical)-direction though iterations. It can be seen that, following differentiation, the most negative value appears at x=41 and the most positive value appears at x=62 in all iterations such that every correction occurs at proper positions and the profiles gradually approach to a straight line at zero, which indicates complete artifact removal, without any negative-valued streaks left in the CT image at the end of performing iterations. This embodiment also demonstrates the progression of the removal of artifacts though iterations at two different locations in the CT image, as shown in FIG. 4E, where a straight line at zero is expected at the end of correction; as shown in FIG. 4F, where values of one are expected within the square region at the end of correction. FIG. 4E shows a profile at y=$25^{th}$ pixel though iterations [red dotted line in FIG. 4B]. FIG. 4F shows a profile at y=$51^{st}$ pixel though iterations [white dashed line in FIG. 4B]. It can be clearly seen that the artifacts gradually disappear as the algorithm proceeds and both profiles approach the expected values. Also, note that in FIG. 4E, the profile at iteration 1 resembles the blue curve in FIG. 2D, but with the reversed sign because the signals of the blue curve are mostly missing due to discretization (vs. the red lines in FIG. 2I) in the vertical back-projection, contributing an inverted profile (the artifact) to the CT reconstruction (also see FIG. 2J).

The statistics of the results of the square geometry, as well as the results of other geometries, are shown in Table 1 and FIG. 5. Table 1 and FIG. 5 demonstrate that the artifacts have higher magnitude when produced by longer sharp edges and that the objects located in the streak path may be impacted by the artifacts more than the objects actually producing them.

Table 1 shows the statistics of the results of the square geometry ($1^{st}$ column with numbers). In this case, while the mean value of the main object (the square) only drops by 1.2% due to the artifacts, the minimum value drops by 6%. Following the correction, all statistics exhibit errors ≤0.02%.

In the case of square geometry, it can be seen that the intensity deviation due to the sharp-edge artifacts is not very high (although it may already cause issues depending on the applications). However, the magnitude of deviations and their relative effects highly depend on the geometry of the object that produces the artifacts, as well as the intensity and size of other objects that lie in the paths of the streak artifacts.

FIG. 5, first row, shows the results of a rectangular geometry. With the same pixel color scale/heat map as in FIG. 5, it can be clearly seen that the artifact now has a more profound effect on pixel intensities than the case of the square geometry (middle panel vs. FIG. 4B). Again, following the correction using the proposed algorithm, there is no streak artifact that is visually noticeable (right panel), and the resulting image resembles the ground-truth image (left panel). In this case, it can be seen (also see Table 1) that the mean value drops by 6.5% and the minimum value drops by 9%, while all statistics are greatly improved (errors≤0.07%) at the end of iterations.

In normal cases, unless an object has very long sharp edges, the artifacts it produces may not quantitatively alter its own phase signature too much, as shown in the two examples above. However, the missing-intensity artifacts may become a much greater concern when the streaks pass through other objects, especially when the objects the streaks pass through have relatively low intensity or small size. This is demonstrated in FIG. 5, second row, where the streaks from the same rectangle as in the first row of FIG. 5 pass through a circular object, which itself does not produce missing-intensity artifacts but whose signature is altered by them. Before further checking the quantitative results, it can be immediately observed that the circular object is "cut" by the streak (middle panel) and hence may be segmented differently from the object as a whole. Applying the correction algorithm to the rectangle+circle image restores the pixel intensity (right panel). The circular object is assigned a relatively low phase signature intensity (10% of the rectangular object), and note that in this case, it has much lower altered minimum intensity relative to its own ground-truth value (dropping by 84%; see Table 1) compared to the object causing the artifact (the rectangle; only 9%). Also note that while the artifact never increases the maximum signature intensity of the causing object (the rectangle), it increases that of the circle by 64% (Table 1).

Another example shown in Table 1 shows that if the circular object has a much smaller size (radius=1 pixel), then the artifact will also greatly affect the mean object intensity. While the minimum intensity again drops by 84% as in the case of a larger circle (radius=10 pixels), the mean intensity also drops by 50%. Note that in this case, maximum intensity decreases by 27% instead of increasing, and this is because the positive-intensity artifact peaks are now located outside the smaller-sized circle.

In both of the above cases of rectangle+circle objects, the algorithm restores the statistical values with errors≤1.6% if using multiplication factor=4, and with errors <0.05% if using multiplication factor=8. It can be seen that with a larger multiplication factor, the convergence is indeed faster (i.e. achieving lower errors with a fixed number of iterations; as seen in FIG. 3).

While in some cases the artifact-causing objects have paired parallel sharp edges, such as those of a square or a rectangle as described above, single sharp edges (appearing at single or multiple projection angles) occur too. Examples are triangles and semicircles (or any object with a curved surface and a flat surface). To demonstrate an embodiment of the algorithm can also remove artifacts caused by single sharp edges, simulations were performed with a circular-segment object (bounded by a chord and an arc of a circle), which produces a single streak artifact with an inverted Hilbert-impulse-response profile, as shown in the third row of FIG. 5. Note that for comparison purpose, the length of the sharp edge is kept the same as in the rectangle case. It can be seen that the algorithm removes the artifacts. As shown in Table 1, all statistics are greatly improved (errors≤0.01%) at the end of the iterations.

In order to determine how the streak artifacts alter the signature of a close-by object, a circular object is placed in the path of the streak, as shown in the fourth row of FIG. 5, in the same way as in the rectangle+circle case, as shown in the second row of FIG. 5. Artifact removal can again be observed. A smaller circle with radius=1 pixel (instead of 10 pixels) is also simulated. Quantification results with multi-plication factor=4 and 8 for both sizes of the circular objects are listed in Table 1, demonstrating successful artifact removal. For the multiplication factor=4, twenty iterations were performed.

Experiments Validating the Algorithm Performance with Real Data

In an embodiment, the algorithm was applied to real DPC CT images and evaluate the algorithm's performance. Data sets that were shown earlier were used, and it is observed that most of the sharp-edge artifacts can be removed and pixel intensities in sinograms and CT images can be restored.

Figures 6A, 6B:
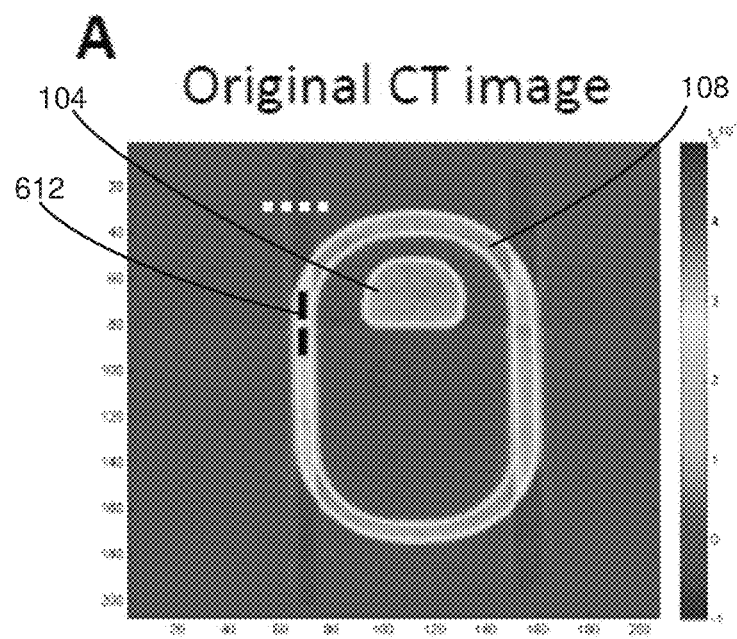
Figure 6C:
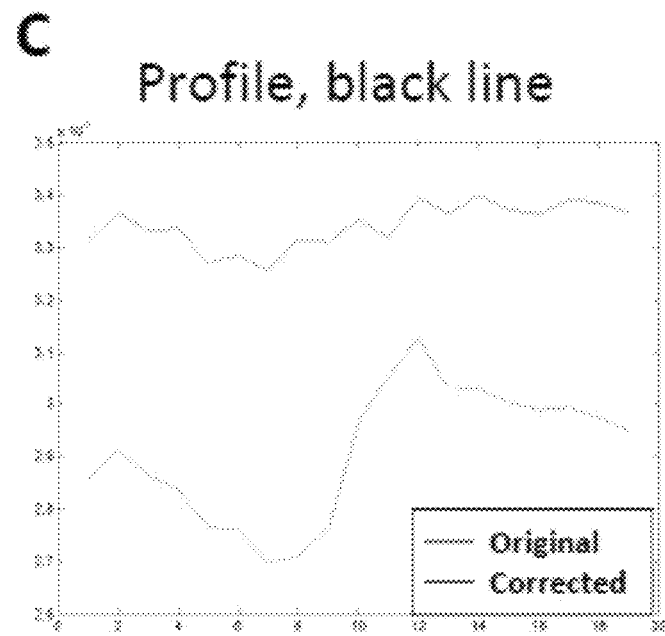
Figure 6D:
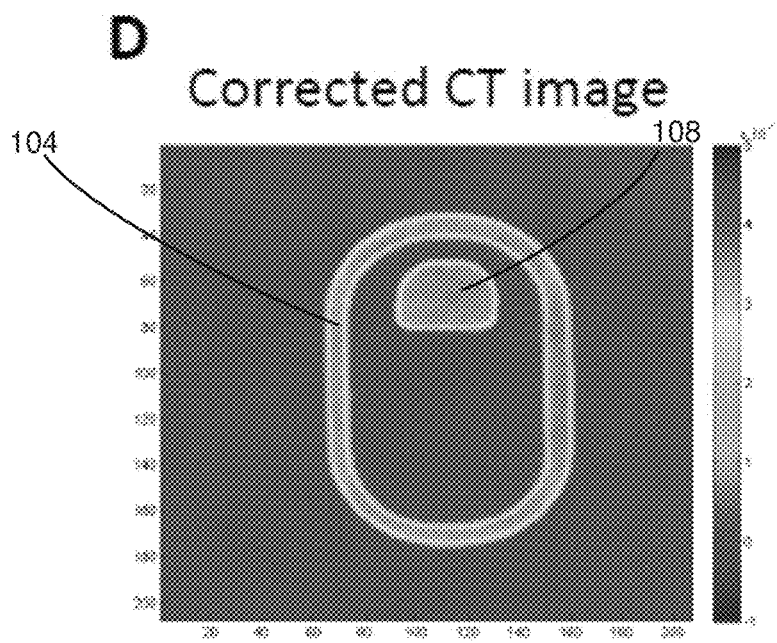
Figure 6E:
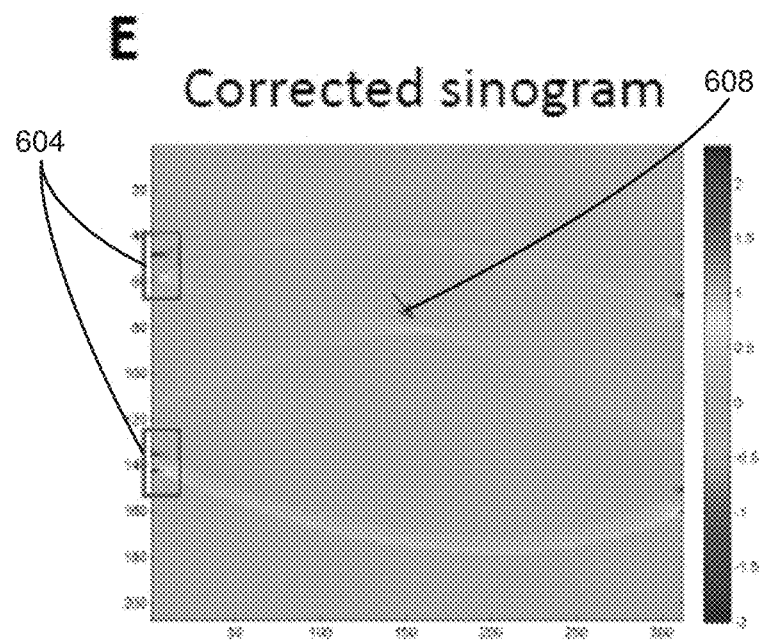
Figure 6F:
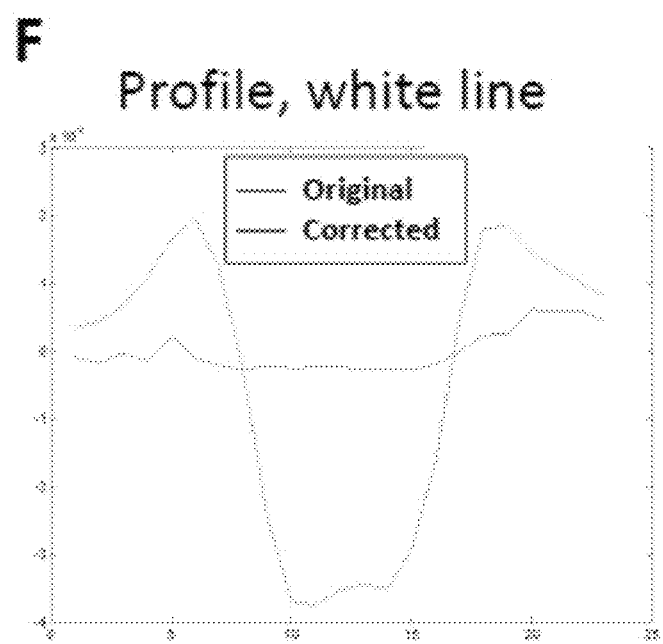

The first data set is the DPC CT of a plastic toothbrush 104 with a case 108, shown in FIGS. 1A,B and FIGS. 6A,D. FIGS. 6A-F illustrate the removal of artifacts produced by sharp edges of a plastic toothbrush with a case by an embodiment. It can be observed in FIG. 6A that two vertical streaks originate from the sharp edges of the toothbrush case, while one weaker horizontal streak appears due to the single sharp edge of the toothbrush. In FIG. 6D, it can be clearly seen that most of these artificial streaks are removed following the implementation of the algorithm. In FIGS. 6B and E, the corresponding sinograms are shown, in which the missing intensities are restored (purple boxes 604, corresponding to the vertical streaks in FIG. 6A, and purple arrows 608, corresponding to the horizontal streak in FIG. 6A). The purple boxes and arrows indicate the locations of restoration of missing intensity. Note that only half of the sinogram is shown in each case. The other half exhibits similar behaviors. FIG. 6C shows the original intensity profile along the vertical black dashed line on the image of FIG. 6A, as a red graph line, and the corresponding corrected intensity profile on the image of FIG. 6D, as a blue graph line. FIG. 6F shows the original intensity profile along the horizontal white dotted line on the image of FIG. 6A, shown as red graph line, and the corresponding corrected intensity profile on the image of FIG. 6D, shown as a blue graph line. Parameters used is the number of iterations=20, thresholding percentile=99.9, multiplication factor=5. To demonstrate results in a more quantitative way, the intensity profiles are shown in FIGS. 6C and F, where it can be observed that the intensity variations caused by the artifacts are mostly removed. Note that in FIG. 6C, the overall intensity is higher following corrections, and this is due to the removal of the vertical streaks since the profile (the black dashed line 612) lies entirely in one of them. The intensity increase in FIG. 6C hence roughly corresponds to the restoration of the intensity values of the trough region shown in FIG. 6F.

Figure 7A:
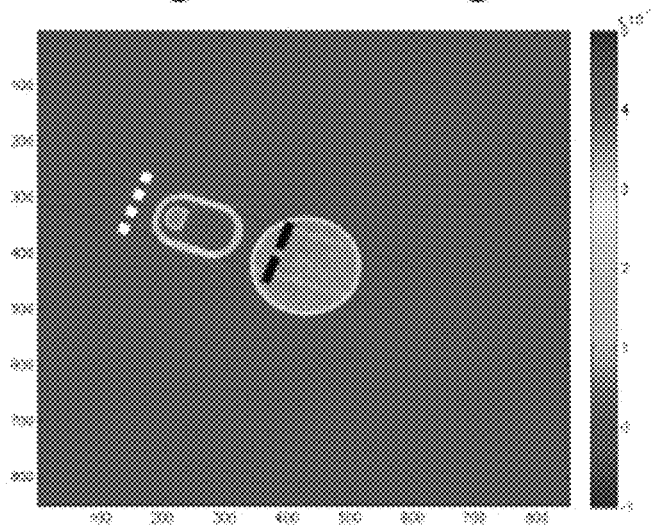
Figure 7B:
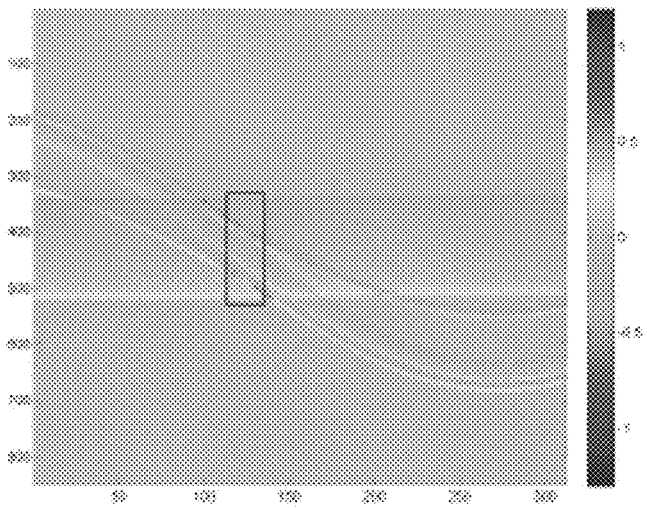
Figure 7C:
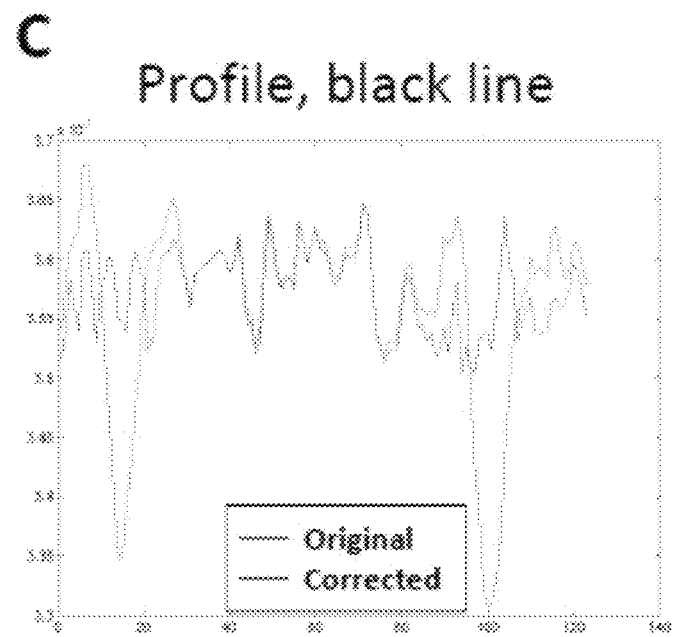
Figure 7D:
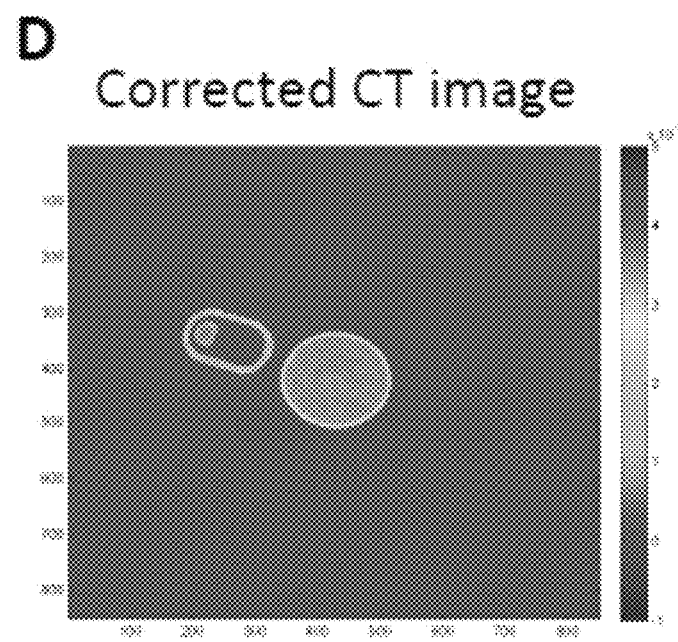
Figure 7E:
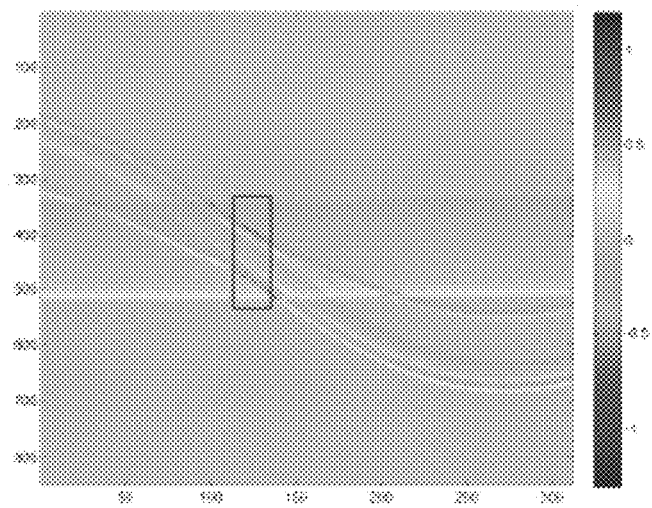
Figure 7F:
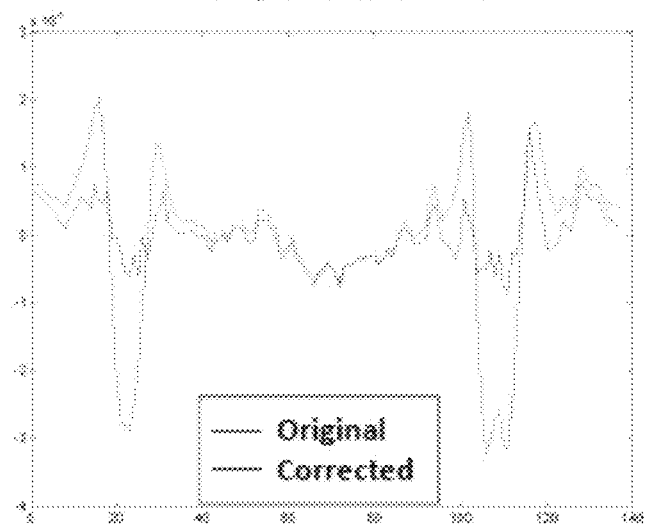

A second data set consists of a plastic toothbrush with a case, plus a cylindrical tube filled with water, as shown in FIGS. 7A-F and FIG. 1B. By comparing FIG. 7A and FIG. 7D, it can be seen that, following corrections, most of the artificial streaks are removed, not only in the toothbrush and the background air regions but also in the water region. This not only is beneficial for quantification, which may influence automated material identification as is demonstrated below, but also improves image segmentation, which could have been obscured by the streaks and wrongly produced several items from one single object. In FIGS. 7B and 7E, the corresponding sinograms are shown, in which the missing intensities can again be seen restored, and in FIGS. 7C and 7F, the intensity variations produced by the streaks are removed, as seen in the intensity profiles. The purple boxes indicate the locations of restoration of missing intensity. Only half of the sinogram is shown in each case. The other half exhibits similar behaviors. In FIG. 7C, the original intensity profile along the black dashed line on the image FIG. 7A is shown by the red graph line and the corresponding corrected intensity profile on the image of FIG. 7D is shown by the blue graph line. In FIG. 7F the original intensity profile along the white dotted line on the image of FIG. 7A is shown by the red graph line and the corresponding corrected intensity profile on the image of FIG. 7D is shown by the blue graph line. Parameters used are the number of iterations=20, thresholding percentile=99.99, and multiplication factor=4.

In FIG. 6A and FIG. 7A, the smearing of the negative-valued streaks close to the image boundaries (away from the object causing the streaks) can be observed, and this phenomenon is due to the existence of multiple pixels with missing intensity at nearby projection angles in the sinogram. They produce overlapping artifacts that strengthen in close proximity to the object but weaken (positive and negative values cancel out to some extent) otherwise.

Improvements in Automatic Material Identification by the Proposed Algorithm

Following the correction of artifacts and the restoration of pixel intensities described in the previous sub-section, it will be shown whether DPC phase signatures altered by sharp-edge artifacts may introduce errors in automatic material identification and whether the algorithm can help prevent it from happening.

FIGS. 8A-C show data distributions and query points in material identification. FIG. 8A shows the signature distributions of a small data set of nine materials in 3-dimensional space (with data of water and all other materials acquired in a separate experiment; note that the powder signature is provided by a tube of concealer with salicylic acid and silicone powder). This data set will be used for a simple demonstration of (1) the superior material discriminability of DPC tri-signatures over ABS signature only, and more importantly, (2) how the proposed algorithm removes potential errors of material discrimination introduced by clutter when using DPC tri-signatures.

In FIG. 8B, the centroid of each material distribution is shown. Note that, similar to FIG. 8A, glycerol, vinegar, and water are too close together in the 3-dimensional feature space to distinguish in the figures. These 9 centroid points will be used as reference query points to test various discrimination systems of various embodiments—since they are at the centers of the distributions, definite discrimination results should be obtained as long as the discrimination systems can clearly separate the 9 materials.

FIG. 8C shows an enlarged region of FIG. 8A for more detailed distributions of glycerol, vinegar, water, and plastic, but in a 2-dimensional DPC (phase) vs. ABS view. Water signature values altered by the sharp-edge artifacts before and after correction are also indicated (mean values obtained from the most affected region in the images of FIG. 7A and FIG. 7D, respectively). Clearly, the effect of the artifacts on the water phase signature is large enough to make it shift completely outside the water distribution. Following corrections, it can be observed that the signature shifts back into the water distribution.

Next, it is investigated, in a more quantitative way, whether the altered signature value and its corrected value will be classified as a material other than water using automatic material discrimination systems. Intuitively, based on further inspection of FIG. 8C, the altered, uncorrected signature value is more likely to be identified as vinegar, which has a larger distribution towards lower phase values, and the corrected signature value should be identified as water.

The quantitative results are shown in Table 2, with which the superior material discriminability of DPC tri-signatures over ABS signature only is demonstrated. In Table 2, the first nine rows with data show the classification results of the references, which are the centroid (mean) values (FIG. 8B) of the distributions (FIG. 8A)—the same distributions used in the statistical model for fitting and in the artificial neural network (ANN) model for training, validation, and test. The maximum outputs of the models for the classification of references should have high values (close to one) with correct material identification when the distributions do not overlap, and this is exactly the case when all three DPC signatures are used (for both ANN and statistical models; Table 2, first four columns) When using only an ABS signature, however, it was noticed that the models in some embodiments have difficulty identifying paper and earplug—the ANN model identifies the paper as an earplug and the statistical model fails to provide classifications with high confidence (both values <0.65). The lower performance of the models is a direct result of the overlapping distributions of the two objects in the ABS dimension, which can be observed in FIG. 8A. The influence of the overlapping distributions is also reflected in the training process of ANN, as shown in FIGS. 9A-C The influence of the overlapping distributions in the ABS dimension is reflected in the training process of ANN. This is shown in FIGS. 9A-C, where classes #2 (earplug) and #5 (paper) cannot be clearly discriminated with certainty using only ABS signature, shown in FIG. 9C, while DPC tri-signatures successfully resolve all materials with high certainty shown in FIG. 9B. The target of the ANN training process is shown in FIG. 9A. In all panels, the horizontal axis indicates different sample points and the vertical axis indicates different classes (objects), with water, earplug, foam, glass, paper, plastic, powder, glycerol, and vinegar, designated as 1-9, respectively.

In this disclosure, how the removal of the missing-intensity artifact influences the classification results is investigated, and this is provided in the last two rows in Table 2. When the artifact is uncorrected, it can be seen that the shift of the DPC phase signature, described previously regarding FIG. 8C, introduces errors in classification (water identified as vinegar in both ANN and statistical models). Following corrections, successful identification can be achieved, and this makes the DPC tri-signature classifier nearly perfect for this set of materials. On the other hand, since the ABS signature is not affected by the missing-intensity artifacts, the material identification results are the same before and after corrections.

Discussions and Conclusion

In this embodiment, a simple yet effective novel algorithm to remove X-ray DPC phase CT artifacts caused by missing intensities in projection data due to sharp linear edges in the object is provided. Simulation results are provided to show the characteristics of the algorithm, which are also validated by the experimental data. Material identification is then performed with and without implementing the algorithm, and their difference demonstrates how artifact removal may improve the classification results.

In this section, several key issues that may arise when applying the algorithm to DPC CT reconstruction with subsequent material classification are discussed:

1. Convergence rate of the algorithm.
2. Multiple missing intensities caused by different sharp edges.
3. Multiple missing intensities caused by a single sharp edge.
4. Models for material classification and the database for training.

Regarding the first issue—the convergence rate of the algorithm—it is determined by four factors—the scaling of Hilbert filtering, the scaling of back-projection, the percentage (or fraction) of streak artifact that contributes to the negative-valued pixel sum, and the multiplication factor following thresholding. Note that both Hilbert filtering scaling and negative-valued pixel summation have dependence on the image size and their dependence should cancel out each other—for example, when the number of pixels of the image is doubled in a certain dimension, in that particular dimension the Hilbert filtering scaling will be reduced by half and the negative-valued pixel summation will be doubled. The multiplication product of the four above factors produces an overall factor that indicates the fraction of the remaining magnitude of the artifact that will be removed in one iteration. This also means that in an ideal case, where the first three factors are known, the user-defined fourth factor can be designed to make the product=1, and the artifact removal can be completed instantly in one iteration. In practice, the Hilbert filtering scaling factor and the percentage of streak contribution may need additional efforts to be determined automatically, and therefore, simply setting a properly high multiplication factor, such as 4-8 as suggested (not too high such that the correction signal overshoots; this can be checked in the first few iterations), and performing multiple iterations may be more practical, especially when the imaged objects are in a highly cluttered environment.

Out of the four factors mentioned above, the back-projection scaling factor is a system constant and can be determined easily. Note that in back-projection scaling, a lower number of projection angles (or larger angle increments) makes the streak artifact magnitude higher but also makes convergence faster (if ignoring possible reconstruction errors with a sampling rate<the Nyquist rate). The Hilbert filtering scaling factor is affected by the streak-producing object geometry, e.g. single vs. paired sharp edges, as well as how far apart the paired sharp edges are (the closer they are, the higher the scaling is, while single sharp edges can be considered as infinitely far away from one another). As for the percentage of streak artifact that contributes to the negative-valued pixel sum, it decreases every time the streaks pass through an object (including the streak-producing object itself) in phase CT images. In this case, the negative-valued pixels are likely to be locally absent (becoming positive-valued), reducing the magnitude of the sum of negative-valued pixels and making the convergence rate slower. This explains why more iterations (or a higher multiplication factor) are needed to remove the artifacts produced by the rectangle and circular segment (vs. the square, as indicated in Table 1), whose sharp edges are longer than those of the square and therefore reduce the percentage of streak artifact contributing to the negative-valued pixel sum. On the other hand, while the shorter widths of the rectangle and circular segment (vs. the square, in the horizontal dimension) make their Hilbert filtering scaling slightly larger than that of the square, their overall convergence rate is still slower due to a lower percentage of streak artifact contributing to the sum.

Regarding the second issue—streak artifacts may appear at multiple projection angles due to different sets of sharp edges (which occur in rectangles and squares with one set of vertical edges and one set of horizontal edges). In this case, both thresholding for the highest-absolute-value pixels and subsequent correction of artifacts will be performed sequentially in terms of artifacts at different projection angles (e.g. along the vertical dimension vs. the horizontal dimension), unless they have equal magnitudes (such as in the case of a square). Sequential corrections are automatically achieved by setting proper threshold values or percentiles such that only the streaks with the highest magnitude will be corrected. Once the corrections proceed to a level at which these streaks become lower in magnitude than other streaks, the next set of streaks with the highest magnitude will then be corrected. This sequential correction process will prevent streaks from interfering with one another by altering the summed negative-value profiles of others.

Correction of artifacts appearing at multiple projection angles due to different sets of sharp edges can also be performed simultaneously to speed up convergence, by thresholding highest-absolute-value pixels locally at the corresponding projection angles (which requires additional efforts). This may introduce mutual interference of streaks mentioned above and streaks with lower magnitude may have their highest-absolute-value pixels shift to a different location. Even in this case, the artifacts will still be removed gradually.

The third issue is that missing intensities may occur at consecutive projection angles that are caused by a single sharp edge, which happens quite often in real experiments, as shown in FIG. 6B and FIG. 7B. The number of pixels losing intensity depends on the length of the sharp edge along the projection direction, CT rotation angle increment size, and the imaging system geometry (the detector pixel size and the amplification factor of an object when it is projected onto the detector panel). Considering that, at a certain angle, the projection takes place exactly along a sharp edge (creating an infinitely small pulse of DPC signals with projection length=0, as shown in FIGS. 2A and 2C).

Then, in the next (and also the previous) projection at the next (and the previous) CT angle, the object rotates to a slightly different position (relative to the gantry) and the new projected length in the radial dimension (perpendicular to the projection dimension) on the detector panel is as follows:

Projected length of the sharp edge=actual length of the sharp edge×sin(rotation angle increment)× amplification factor where the amplification factor is the distance between the X-ray source and the detector divided by the distance between the X-ray source and the CT rotation center. If this new projected length is still smaller than the size of one single pixel, it is expected that missing intensities in the recorded signals will be due to discretization. Note that this formula can be used generically for any DPC CT systems to determine the number of pixels in the sinogram with missing intensities caused by a single sharp edge. This can be done by multiplying the "rotation angle increment" in the formula by a positive integer n to calculate the projected length at the next (or the previous) nth CT angle (assuming constant angle increments) and again comparing the calculated projected length with the detector pixel size.

Based on the formula above and taking the system settings as an example (625 equally-distributed projection angles over a 360-degree range, amplification factor=1.7995, and detector pixel size=0.3 mm), the critical lengths of the sharp edge can be calculated to expect different numbers of pixels with missing intensities in the sinogram; if the length <16.58 mm, 8.29 mm, 5.53 mm, or 4.15 mm, 3, 5, 7, or 9 pixels of missing intensity will be seen, respectively. Note that the actual number of pixels with missing intensity may vary slightly since there may be no projections taking place exactly along the sharp edge. The above calculations are consistent with the experimental data; the length of the sharp edges of the toothbrush outer case is roughly 13 mm, causing 3-4 pixels of missing intensity, while the length of the sharp edge of the toothbrush (the inner piece) is roughly 7 mm, causing 5-6 pixels of missing intensity. In both cases, the data FIGS. 6D-E and FIGS. 7D-E demonstrate that the algorithm in this embodiment handles multiple missing intensities well and removes most of the artifacts.

Looking into the fourth issue, starting with the comparisons of the two different material discrimination systems. While both the statistical and machine-learning approaches are capable of serving as an automatic material discrimination system to be used with X-ray DPC CT images, they, however, do have some major differences. The statistical approach has a relatively simple assumption for data distribution, which is a Gaussian mixture, and this makes such an approach easier to implement with good prediction abilities. While this assumption is generally valid, it may not always be. Naturally, if the data distribution has a very unusual three or higher dimensional geometry, the statistical approach may fail to provide the correct classification. On the other hand, the machine-learning/artificial neural network approach does not have any assumptions on the shape of data distribution—it will function well with any kind of distributions, even for unusual ones, and therefore it is a very robust approach. However, in order to build such robust models, it will require a good-quality and high-volume database for the training process.

The above differences also explain why these two approaches have quite different sensitivities over the range of the feature space. The statistical approach is very sensitive to the shape of the distributions, and therefore when the unknown data point is located off of the center of a cluster, the probability values will be away from unity but may still be high enough for discrimination purposes. On the contrary, the machine-learning/ANN model is not as sensitive to where the query point is located inside one given cluster region but does show high sensitivity to whether the query point belongs to the considered cluster (determined based on its training). That being said, with either approach, as long as the material signatures are accurate without overlapping distributions, the discrimination system usually provides excellent results. Further, since each approach has distinct performance, it is believed that by including both approaches in an automatic discrimination system, false alarm rates can be minimized by weighting one over the other depending on the situation.

Note that the statistical and ANN material discrimination systems used in this study are both intentionally designed to be simple, and one reason is that the examples are dealing with a simple classification problem and do not have highly irregular feature space distributions. More importantly, the embodiments focus more on how the accuracy of feature extraction can be influenced by sharp-edge artifacts, and therefore, the discrimination systems are kept simple such that the discrimination errors, if any, can easily be attributed to feature extraction errors that are caused by sharp-edge artifacts, not to model complexity.

As for the database for training in this embodiment, while it is small, it already demonstrates that material discrimination errors may occur due to sharp-edge artifacts and that the algorithm can help remove these errors. When using a larger database (which will be needed for a comprehensive training process for the discrimination models), it is expected that the artifacts will influence the accuracy of classification even more, due to a higher number of material clusters that are potentially closer to one another (or more densely packed) in the feature space, making them more sensitive to shifts of signatures.

Finally, it should be noted that the demonstration provided in this embodiment is only one simple case showing the influence of sharp-edge artifacts on water. A real clinical scan or luggage scan with clutter can potentially have more than one item that causes faster phase accumulation or has sharp linear edges that are longer than those demonstrated in the experiments of this embodiment, producing artificial streaks penetrating multiple objects and causing greater DPC phase signature shifts. Also, in practice, the resolution of the detectors found in commercial CT scanners may be inferior to that of the detector used in this embodiment, and this introduces more severe artifacts, as discussed above. Therefore, correction of these artifacts becomes even more crucial when using tri-signatures for material identification and target recognition in practical applications, and the algorithm demonstrated in this embodiment provides a solution.

An embodiment provides a novel algorithm for removing DPC phase CT artifacts caused by sharp edges, demonstrated its performance, and shown that potential material identification errors using DPC tri-signatures can be corrected with the algorithm. It is believed that the algorithm will become an indispensable tool as X-ray DPC CT technology emerges in real-world applications and commercial uses.

Simulation Settings

The purpose of the simulations is to characterize the algorithm using various geometries and combinations of objects in DPC phase CT images, to evaluate its performance, and to help establish its theoretical basis.

In the simulations, ground-truth images are first constructed. Then projected pixel intensities are assumed missing exactly at the projection angles along the sharp edges, e.g. vertical and horizontal directions for the square and rectangle cases. While this is a simplified case, it is still a good approximation for real experiments with relatively high detector resolution and/or a relatively low number of projection angles (in some cases, intensities of pixels at multiple projection angles in proximity may be missing). The artifacts are then created based on the missing intensity locations and the Hilbert-filtered back-projection operation. The artifact-corrupted images then serve as the original (uncorrected) CT image to be corrected and the proposed algorithm is performed as shown in FIG. 3.

Other simulation settings are as follows. Parallel-beam geometry and forward difference of projection data with single-pixel zero padding at the beginning of the data are used; main object (square, rectangle, and circular segment) intensity=1; circle intensity=0.1; number of projection angles=180 with 1-degree increments.

Equipment and Experimental Settings

Some details of the three-grating DPC CT imaging system are as follows. The distance between the X-ray source and the detector is 1366 mm, while the distance between the source and the CT rotation center is 759.1 mm. The gratings are designed for 28 KeV X-ray energy, with the pitch sizes of the first, second, and third gratings=18.9 µm, 9.04 µm, and 6.074 µm, respectively. Also, 50 kVp is used as the X-ray source kV, and the current is 10 mA. For phase retrieval, a phase-shifting interferometry algorithm is used with 11 phase steps. Full CT scan is performed with 625 equally-distributed projection angles over a 360-degree range, and a detection pixel size of ~300 µm (with 4×4 hardware binning) is used.

Sample Materials

To demonstrate the ability of the algorithm of this embodiment to remove sharp-edge artifacts in DPC phase CT images from real data, as well as to provide material signatures for training the automatic discrimination systems, we use different samples as follows. A tube of water is used for artifact removal studies, and a toothbrush is used for artifact removal studies and also for providing reference plastic signature (portions not affected by artifacts are used). All other materials are used only for providing reference signatures in the training process of the automatic discrimination systems. References for water, glycerol, and vinegar are provided from a separate study.

Each reference object is imaged individually. Following CT reconstruction, pixels within each object are retrieved and the distributions are used to construct the database for the training of the automatic discrimination systems.

Extended Field of View (FOV) Acquisition

The field of view (FOV) of each projection is limited by the area of the gratings used when implementing grating-based X-ray DPC imaging. In conventional X-ray absorption CT—it has been reported—that panoramic or offset imaging configurations can extend the field of view. Some embodiments adapt the panoramic configuration for achieving extended-FOV DPC projection.

As a brief description of a DPC projection extended FOV approach in an embodiment, the imaged object (instead of the detector and X-ray source) is translated in the xy plane (the CT slice plane) once for each individual FOV acquisition, while it is also rotated in the same plane with an angle such that the correct corresponding panoramic view of the imaged portion of the object can be acquired. Starting from roughly the center of the object (or group of objects), this sequential FOV acquisition is performed towards both ends of the object (or group of objects). All FOVs are then stitched together based on a common linear-detector plane with fan-beam configuration and the corresponding pixel re-binning Using this technique, DPC images with an extended FOV of 28.5 cm across are successfully acquired. Larger FOVs are also possible, limited only by the size of the equipment.

In this embodiment, the extended-FOV technique was used to image the water+toothbrush sample set. In this case, five individual FOVs, each of which is ~6 cm across with roughly 25.5% overlap in contiguous FOV pairs, are acquired to achieve an extended FOV of ~26 cm. All ABS, DPC, and VIS projection images are processed similarly to obtain tri-signature features with extended FOVs.

CT Image Reconstruction

All projection images with (for the water+toothbrush set) or without (for individual objects) extended FOVs are used in CT image reconstruction. To achieve the reconstruction, in this embodiment, a conventional filtered back-projection (FBP) method was used to reconstruct two-dimensional (2D) CT slices using 625 views. Due to the differential nature of the DPC signals, either the signals have to be integrated first before FBP, or the FBP approach has to be modified. Here, in DPC phase CT reconstruction, Hilbert filter is used instead of the Ram-Lak (ramp) filter in FBP, while unmodified FBP is used for ABS and VIS CT reconstruction. All CT reconstruction is performed without apodization.

Background correction is also applied to DPC signals. In the sinogram domain, DPC signals should have a summation of zero in the radial direction, since on the edges of the imaging region the material is air only, and the summation represents the overall change of the signals, which should be none. This correction is performed before implementing the algorithm of sharp-edge artifact removal.

Furthermore, fan-beam geometry is included in the CT reconstruction algorithms. In the system of this embodiment, one single field of view (FOV) has a fan angle of roughly 2 degrees, which is small enough to ignore. However, using the extended FOV technique with five individual FOVs in total and roughly 25.5% FOV overlap, the entire stitched FOV has ~9 degrees across the virtual fan beam, which is large enough to cause visual distortions if using parallel-beam geometry. By incorporating the fan-beam geometry in the reconstruction, such distortions can be eliminated.

Automatic Discrimination Systems: Statistical Approach

In the statistical-approach-based discrimination system, a database of materials with their ABS, DPC, and VIS information can be represented in a three-dimensional (3D) space. The distribution of any single-material features in such 3D space consists of pixel intensities within each material. One assumption is that the features of all materials exhibit high-dimensional Gaussian distributions with specific centers (represented by the mean values of the distributions) and spread sizes (represented by the covariance values of the distributions).

The combined distributions (from all materials, each of which is labeled by a latent variable, z) form a Gaussian mixture, which can be clustered and fully quantified using the Expectation-Maximization (EM) algorithm. However, a simpler approach can be used here: the latent variable z is actually known when building the database, and therefore, each material can be fit by a 3D Gaussian model separately, which provides higher accuracy and computational speed.

The probability of an unknown material is a certain material in the database can then be inferred by the p-value depicting how deeply the unknown (query) point (i.e. the centroid of the unknown material cluster) is embedded inside the distribution of each material, and this can be obtained using the corresponding cumulative distribution function. The p-values are then normalized to the sum of all p-values from all materials to provide the final outputs, the highest value of which indicates the identity of the query point.

Automatic Discrimination Systems: Machine-Learning Approach

The machine learning model used here for a machine learning automatic discrimination system is a two-layer artificial neural network (ANN) model, in which each node, or neuron, implements a nonlinear operation (using a tangent sigmoid in this case) following a summation of all the (differently weighted) neuron inputs and a bias. This is true for both the hidden neuron layer (which takes in the input data points) and the output neuron layer (which returns the outputs). In a model of this embodiment, each data point has three inputs (ABS, DPC, and VIS), and the N outputs will ideally be binary indicators that describe which one of the N clusters (or N materials) the input data point belongs to.

In this embodiment, the output is not exactly binary, which is common, the cluster with the highest output value can be assigned as the unknown data point's classification. In other words, the ANN output can be used as a metric similar to the probability in the statistical approach described in the previous sub-section.

In this embodiment, 10 hidden neurons are used and 200,000 training iterations are performed. In each training session, the dataset is randomly divided into 70% of data for training and 15% of data for each of validation and test.

Numerical Tools

The CT image reconstruction, segmentation, feature extraction, artifact removal, and automatic discrimination are encoded and implemented using MATLAB (MathWorks). For the machine learning/artificial neural network (ANN) model, the Neural Network Toolbox is utilized. The same ANN model is also constructed using TensorFlow in Python to confirm the results from MATLAB.

Overview

FIG. 10 is a schematic view of a system of an embodiment. A differential phase contrast imaging CT system 1000 comprises a gantry 1004, a support 1008, a first amplitude grating 1020, a phase grating 1021, a second amplitude grating 1022, and a controller 1012. The gantry 1004 supports an x-ray source 1016, the first amplitude grating 1020, the phase grating 1021, the second amplitude grating 1022, and an x-ray detector 1024. The x-ray detector 1024 has detector elements 1026, where the detector elements 1026 have a width. The gantry 1004 rotates the x-ray source 1016, first amplitude grating 1020, the phase grating 1021, the second amplitude grating 1022, and x-ray detector 1024 around an axis of rotation 1028 that extends into the page. The support 1008 supports an object 1032 to be scanned. The support 1008 or gantry 1004 translates the object 1032 with respect to the x-ray source 1016, the first amplitude grating 1020, the phase grating 1021, the second amplitude grating 1022, and x-ray detector 1024 along the axis of rotation 1028 through an aperture 1036 in the gantry 1004. In this embodiment, the x-ray source 1016 provides a collimated beam that has a cross-section with a length and thickness. The axis of rotation 1028 is substantially perpendicular to the length of the cross-section of the collimated beam. In other embodiments, other grating configurations may be provided.

FIG. 11 is a high-level block diagram showing a computer system 1100, which may be used to provide the controller 1012. The computer system may have many physical forms ranging from an integrated circuit, a printed circuit board, and a small handheld device up to a computer. The computer system 1100 includes one or more processors 1102, and further can include an electronic display device 1104, a main memory 1106 (e.g., random access memory (RAM)), data storage device 1108 (e.g., hard disk drive), removable storage device 1110 (e.g., optical disk drive), user interface devices 1112 (e.g., keyboards, touch screens, keypads, mice or other pointing devices, etc.), and a communication interface 1114 (e.g., wireless network interface). The communication interface 1114 allows software and data to be transferred between the computer system 1100 and external devices via a link. The system may also include a communications infrastructure 1116 (e.g., a communications bus, cross-over bar, or network) to which the aforementioned devices/modules are connected.

Information transferred via communications interface 1114 may be in the form of signals such as electronic, electromagnetic, optical, or other signals capable of being received by communications interface 1114, via a communication link that carries signals and may be implemented using wire, cable, fiber optics, a phone line, a cellular phone link, a radio frequency link, and/or other communication channels. With such a communications interface, it is contemplated that the one or more processors 1102 might receive information from a network, or might output information to the network in the course of performing the above-described method steps. Furthermore, method embodiments of the present invention may execute solely upon the processors or may execute over a network such as the Internet in conjunction with remote processors that share a portion of the processing.

The term "non-transient computer readable media" is used generally to refer to media such as main memory, secondary memory, removable storage, and storage devices, such as hard disks, flash memory, disk drive memory, CD-ROM and other forms of persistent memory and shall not be construed to cover transitory subject matter, such as carrier waves or signals. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

FIG. 12 is a high level flow chart of an embodiment. Image data is obtained (step 1204). The obtained image data has distorted data due to spatial variation. In an embodiment, the image data is DPC imaging data. The distorted image data is corrected to provide corrected image data (step 1208).

In an embodiment, image data is obtained (step 1204) using the CT system 1000. In this example, the CT system uses differential phase contrast imaging to image the object 1032. The x-ray detector 1024 has a pixel size, which is the resolution of each detector element 1026 of the x-ray detector 1024. When the width of the spatial variation is sub-pixel, which is smaller than the pixel size at a pixel, the data for that pixel is distorted. The distortion is caused by a physical object characterized by a gradient of a real part of an index of refraction, wherein a width of the gradient is the spatial variation width. The data with distorted data is stored on a storage device 1108.

The distorted data is corrected (step 1208). FIG. 13 is a more detailed flow chart of an embodiment of the step of correcting the distorted data (step 1208). A Hilbert-filtered back projection of the data is used to create an image (step 1304). All positive-valued pixels are set to zero in the image, and all values of pixels with negative values are kept in the image to create a negative value image with only negative-valued data (step 1308). The negative value image with only negative-valued data is projected to produce a correction sinogram (step 1312). The correction sinogram is differentiated (step 1316). Pixels with highest absolute values, highest magnitudes, in the differentiated correction sinogram, are kept (step 1320). The highest absolute values that are kept are multiplied by a factor (step 1324). In this example, the factor is in the range from 4 to 8. The highest absolute values multiplied by the factor are subtracted from the data to create corrected data (step 1328). The data is replaced with the corrected data (step 1332). This process may be repeated for one or more cycles as an iterative process (step 1336). The iterative process corrects the distorted data.

In various embodiments, the corrective process is done only once. In various embodiments, data from other x-ray processes or optical processes may be corrected. For example, an x-ray device that is not a CT device may be used. In such embodiments, instead of using a sinogram, a few projections may be used. In other embodiments, instead of generating images for a full CT scan a limited number of views from the CT may be generated. In other embodiments, the storage device 1108 is not directly connected to a data collection device. Instead, the data may be collected on another system and then transmitted and stored on the storage device 1108. In other embodiments, instead of keeping negative values, values less than a threshold value or values within a specified range are kept. In various embodiments, the spatial variation width being sub-pixel means that the width of the projection of the spatial variation on the detector is sub-pixel.

Although a third generation CT system is shown in the example, other generation CT systems and other x-ray systems may be used. In addition, other imaging systems may be used. In a differential phase contrast imaging device, gratings may be added.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, modifications, and various substitute equivalents as fall within the true spirit and scope of the present invention.

TABLE 1

| | sample geometry | square | rectangle | rectangle + additional circle | | | | circular segment | circular segment + additional circle | | | |
|---|---|---|---|---|---|---|---|---|---|---|---|---|
| | no. of iterations | 10 | 20 | 20 | | | | 20 | 20 | | | |
| | multiplication fac. | 4 | 4 | 4 | 8 | 4 | 8 | 4 | 4 | 8 | 4 | 8 |
| | additional circle radius (pixels) | | | 10 | | 1 | | | 10 | | 1 | |
| main object, uncorrected | mean | 0.9882 | 0.9345 | 0.9345 | | | | 0.9789 | 0.9789 | | | |
| | maximum | 0.9958 | 0.9731 | 0.9731 | | | | 0.9964 | 0.9964 | | | |
| | minimum | 0.9407 | 0.9116 | 0.9116 | | | | 0.9292 | 0.9292 | | | |
| main object, corrected | mean | 1.0000 | 0.9996 | 0.9988 | 1.0000 | 0.9996 | 1.0000 | 1.0000 | 0.9995 | 1.0000 | 1.0000 | 1.0000 |
| | maximum | 1.0000 | 0.9997 | 0.9995 | 1.0000 | 0.9997 | 1.0000 | 1.0000 | 0.9999 | 1.0000 | 1.0000 | 1.0000 |
| | minimum | 0.9998 | 0.9993 | 0.9981 | 1.0000 | 0.9993 | 1.0000 | 0.9999 | 0.9984 | 1.0000 | 0.9999 | 1.0000 |
| additional circle, uncorrected | mean | | | 0.0987 | | 0.0503 | | | 0.0933 | | 0.0751 | |
| | maximum | | | 0.1640 | | 0.0733 | | | 0.1708 | | 0.0866 | |
| | minimum | | | 0.0159 | | 0.0159 | | | 0.0292 | | 0.0292 | |
| additional circle, corrected | mean | | | 0.0999 | 0.1000 | 0.0998 | 0.1000 | | 0.1000 | 0.1000 | 0.1000 | 0.1000 |
| | maximum | | | 0.1010 | 0.1000 | 0.0998 | 0.1000 | | 0.1016 | 0.1000 | 0.1000 | 0.1000 |
| | minimum | | | 0.0984 | 0.1000 | 0.0998 | 0.1000 | | 0.0984 | 0.1000 | 0.0999 | 0.1000 |

TABLE 2

| | | ANN, tri-signatures | | statistical, tri-signatures | | ANN, ABS only | | statistical, ABS only | |
|---|---|---|---|---|---|---|---|---|---|
| | object | classification | max. output | classification | max. output | classification | max. output | classification | max. output |
| references | water | water | 0.9992 | water | 1.0000 | water | 1.0000 | water | 1.0000 |
| | earplug | earplug | 1.0000 | earplug | 1.0000 | earplug | 0.8436 | earplug | 0.6383 |
| | foam | foam | 1.0000 | foam | 1.0000 | foam | 1.0000 | foam | 0.9881 |
| | glass | glass | 0.9997 | glass | 1.0000 | glass | 0.9998 | glass | 1.0000 |
| | paper | paper | 1.0000 | paper | 1.0000 | earplug | 0.8334 | paper | 0.6457 |
| | plastic | plastic | 1.0000 | plastic | 1.0000 | plastic | 0.9998 | plastic | 1.0000 |
| | powder | powder | 1.0000 | powder | 1.0000 | powder | 1.0000 | powder | 1.0000 |
| | glycerol | glycerol | 1.0000 | glycerol | 1.0000 | glycerol | 0.9993 | glycerol | 1.0000 |
| | vinegar | vinegar | 0.9995 | vinegar | 1.0000 | vinegar | 1.0000 | vinegar | 1.0000 |
| queries, with artifact | water, uncorrected | vinegar | 1.0000 | vinegar | 0.8298 | water | 0.9964 | water | 0.9992 |
| | water, corrected | water | 0.9967 | water | 0.9997 | water | 0.9964 | water | 0.9992 |

What is claimed is:

1. A method for correcting image data from a differential phase contrast imaging system comprising:

obtaining image data comprising distorted data due to spatial variation of an object caused by a gradient of an index of refraction, wherein the differential phase contrast imaging system has a pixel size and wherein the spatial variation has a width which is sub-pixel, causing the distorted data; and correcting the image data by correcting the distorted data due to sub-pixel width of the spatial variation caused by the gradient of the index of refraction, comprising the steps of:
  creating an image from the image data;
  creating a sinogram from the image; and
  using the sinogram to provide corrected data.

2. The method, as recited in claim 1, wherein the distorted data further is caused by a physical object characterized by a gradient of a real part of an index of refraction, wherein a width of the gradient is the spatial variation width.

3. The method, as recited in claim 1, wherein the correcting the distorted data substantially removes distortion created by the distorted data.

4. The method, as recited in claim 1, wherein the correcting the data is an iterative process.

5. A method for correcting image data from a differential phase contrast imaging system comprising:
  obtaining image data comprising distorted data due to spatial variation; and
  correcting the image data by correcting the distorted data, wherein the correcting the data, comprises at least one cycle, wherein each cycle comprises:
  a) performing a Hilbert-filtered back projection of the data to create an image;
  b) setting all positive-valued pixels to zero in the image, and keeping all values of pixels with negative values in the image to create a negative value image with the only negative-valued data;
  c) projecting the negative value image with only negative-valued data to produce a correction sinogram;
  d) differentiating the correction sinogram to provide a differentiated correction sinogram;
  e) keeping pixels with highest absolute values in the differentiated correction sinogram;
  f) multiplying the highest absolute values by a factor;
  g) subtracting the highest absolute values multiplied by the factor from the data to create corrected data; and
  h) replacing the data with the corrected data.

6. The method, as recited in claim 5, wherein the cycle is repeated at least twice.

7. The method, as recited in claim 1, wherein the differential phase contrast imaging system is a differential phase contrast computed tomography imaging system.

8. A system configured for correcting image data from a differential phase contrast imaging system with a detection pixel size comprising:
  an imaging system for generating differential phase contrast imaging data of an object;
  a data storage device, configured to store image data from a differential phase contrast imaging of an object, wherein the image data comprises distorted data due to spatial variation of an object caused by a refractive index gradient variation;
  a display;
  at least one processor electrically connected to the display and the data storage device; and
  non-transient computer readable media, comprising:
  computer code for correcting the distorted data due to spatial variation of the object caused by a gradient of an index of refraction, wherein the differential phase contrast imaging system has a pixel size and wherein the spatial variation has a width which is sub-pixel, causing the distorted data to provide corrected image data, wherein the computer code comprises:
    computer code for creating an image from the image data;
    computer coded for creating a sinogram from the image; and
    computer code for using the sinogram to provide corrected data; and
  computer code for displaying the corrected image data on the display.

9. The system, as recited in claim 8, wherein distortion is caused by a physical object characterized by a gradient of a real part of an index of refraction, wherein a width of the gradient is the spatial variation width.

10. The system, as recited in claim 8, wherein the computer code for correcting the distorted data substantially is configured to remove distortion created by the distorted data.

11. The system, as recited in claim 8, wherein the computer code for correcting the distorted data is configured to provide an iterative process.

12. A system configured for correcting image data from a differential phase contrast imaging system with a detection pixel size comprising:
  a data storage device, configured to store image data from a differential phase contrast imaging of an object, wherein the image data comprises distorted data due to spatial variation;
  a display;
  at least one processor electrically connected to the display and the data storage device; and
  non-transient computer readable media, comprising:
  computer code for correcting the distorted data to provide corrected image data; and
  computer code for displaying the corrected image data on the display, wherein the computer code for correcting the distorted data is configured to comprise at least one cycle, wherein each cycle comprises:
  a) performing a Hilbert-filtered back projection of the image data to create an image;
  b) setting all positive-valued pixels to zero in the image, and keeping all values of pixels with negative values in the image to create a negative value image with only the negative-valued data;
  c) projecting the negative value image with only negative-valued data to produce a correction sinogram;
  d) differentiating the correction sinogram to create a differentiated correction sinogram;
  e) keeping pixels with highest absolute values in the differentiated correction sinogram;
  f) multiplying the highest absolute values by a factor;
  g) subtracting the highest absolute values multiplied by the factor from the image data to create corrected data; and
  h) replacing the image data with the corrected data.

13. The system, as recited in claim 12, wherein the cycle is repeated at least twice.

14. The system, as recited in claim 8, further configured to comprise a differential phase contrast computed tomography imaging system.

15. The system, as recited in claim 8, wherein the non-transient computer readable media, further comprises:
  computer code for an automatic discrimination system, comprising:
    computer code for a statistical-approach-based discrimination system; and computer code for a machine learning automatic discrimination system.

16. The method, as recited in claim 1, wherein the index of refraction is only with a phase in the interval $[-\pi,\pi]$.

17. The method, as recited in claim 1, wherein the creating the sinogram from the image, comprises:
   using a threshold to create a threshold image from the image; and
   creating a sinogram from the threshold image.

18. The method, as recited in claim 17, wherein the using the threshold to create a threshold image from the image, comprises setting all positive-valued pixels to zero in the image, and keeping all values of pixels with negative values in the image to create a threshold image with the only negative-valued data.

\* \* \* \* \*